(12) United States Patent
Zhang et al.

(10) Patent No.: US 10,037,503 B2
(45) Date of Patent: Jul. 31, 2018

(54) SYSTEM AND METHOD FOR MANAGING SUPPLY OF SERVICE

(71) Applicant: BEIJING DIDI INFINITY TECHNOLOGY AND DEVELOPMENT CO., LTD., Beijing (CN)

(72) Inventors: Lingyu Zhang, Beijing (CN); Bo Zhang, Beijing (CN); Pengcheng Feng, Beijing (CN); Mingcong Sun, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/398,216

(22) Filed: Jan. 4, 2017

(65) Prior Publication Data

US 2018/0129999 A1  May 10, 2018

Related U.S. Application Data

(63) Continuation of application No. 15/306,430, filed as application No. PCT/CN2015/077389 on Apr. 24, 2015.

(30) Foreign Application Priority Data

Apr. 24, 2014 (CN) .......................... 2014 1 0168588
Jul. 29, 2014 (CN) .......................... 2014 1 0366721
Jan. 23, 2015 (CN) .......................... 2015 1 0037388

(51) Int. Cl.
*G06Q 10/06* (2012.01)
*G06Q 30/06* (2012.01)

(52) U.S. Cl.
CPC ... *G06Q 10/06315* (2013.01); *G06Q 30/0635* (2013.01)

(58) Field of Classification Search
CPC ..................... G06Q 10/06315; G06Q 30/0635
See application file for complete search history.

(56) References Cited

U.S. PATENT DOCUMENTS

2002/0082881 A1* 6/2002 Price .................. G06Q 30/0283
                                                    705/400
2004/0267604 A1* 12/2004 Gross ..................... G06Q 30/02
                                                   705/7.29

(Continued)

FOREIGN PATENT DOCUMENTS

CN       1889143 A     1/2007
CN       1932921 A     3/2007

(Continued)

OTHER PUBLICATIONS

Written Opinion of the International Search Authority for PCT/CN2015/077389 dated Aug. 3, 2015, 4 pages.

(Continued)

*Primary Examiner* — Sujay Koneru
(74) *Attorney, Agent, or Firm* — Metis IP LLC

(57) ABSTRACT

Disclosed herein are a system and a method for managing supply of service. The system may include at least one processor that performs the operations including receiving a plurality of orders for a service; marking a locus based on the plurality of orders, the marked locus relating to a first number of orders of the plurality of orders, the first number of orders sharing a first characteristic, and the marked locus relating to a first location; and identifying at least one provider of the service to whom information relating to the marked locus is to be delivered.

20 Claims, 17 Drawing Sheets

(56) References Cited

U.S. PATENT DOCUMENTS

| | | | |
|---|---|---|---|
| 2006/0034201 A1* | 2/2006 | Umeda | G06Q 30/02 370/310 |
| 2006/0200306 A1 | 9/2006 | Adamcyzk | |
| 2008/0189143 A1* | 8/2008 | Wurster | G06Q 10/02 705/5 |
| 2010/0138246 A1 | 6/2010 | Carey et al. | |
| 2010/0144367 A1* | 6/2010 | Goh | G01S 5/0294 455/456.1 |
| 2011/0137699 A1 | 6/2011 | Ben-Ari et al. | |
| 2012/0130627 A1 | 5/2012 | Islam et al. | |
| 2012/0232943 A1 | 9/2012 | Myr | |
| 2012/0265580 A1 | 10/2012 | Kobayashi et al. | |
| 2013/0073327 A1 | 3/2013 | Edelberg | |
| 2013/0110385 A1* | 5/2013 | Heed | G06Q 10/047 701/117 |
| 2013/0132140 A1* | 5/2013 | Amin | G06Q 10/02 705/7.13 |
| 2013/0144831 A1 | 6/2013 | Atlas | |
| 2013/0179205 A1 | 7/2013 | Slinin | |
| 2013/0254289 A1* | 9/2013 | Cutri | H04L 51/32 709/204 |
| 2013/0295963 A1* | 11/2013 | Sen | H04W 4/028 455/456.3 |
| 2014/0011522 A1* | 1/2014 | Lin | H04W 4/023 455/456.2 |
| 2014/0278031 A1 | 9/2014 | Scofield et al. | |
| 2014/0279667 A1* | 9/2014 | Gillen | G06Q 10/0836 705/339 |
| 2015/0012310 A1 | 1/2015 | Shen | |
| 2015/0081362 A1 | 3/2015 | Chadwick et al. | |
| 2015/0339923 A1* | 11/2015 | Konig | G08G 1/202 701/522 |

FOREIGN PATENT DOCUMENTS

| | | |
|---|---|---|
| CN | 101355714 A | 1/2009 |
| CN | 201181988 Y | 1/2009 |
| CN | 101383089 A | 3/2009 |
| CN | 102073970 A | 5/2011 |
| CN | 102158804 A | 8/2011 |
| CN | 102355406 A | 2/2012 |
| CN | 102542790 A | 7/2012 |
| CN | 102752393 A | 10/2012 |
| CN | 102881152 A | 1/2013 |
| CN | 102890861 A | 1/2013 |
| CN | 102938198 A | 2/2013 |
| CN | 103177575 A | 6/2013 |
| CN | 103259783 A | 8/2013 |
| CN | 203288078 U | 11/2013 |
| CN | 103426139 A | 12/2013 |
| CN | 103578265 A | 2/2014 |
| CN | 103985247 A | 8/2014 |
| CN | 103295394 B | 1/2015 |
| CN | 104537831 A | 4/2015 |
| EP | 1100064 A1 | 5/2001 |
| JP | 2002150470 A | 5/2002 |
| JP | 2003044702 A | 2/2003 |
| JP | 2003296887 A | 10/2003 |
| JP | 2003296888 A | 10/2003 |
| JP | 2004062490 A | 2/2004 |
| JP | 2005316983 A | 11/2005 |
| JP | 2007249918 A | 9/2007 |
| JP | 2013134641 A | 7/2013 |
| JP | 2013182597 A | 9/2013 |
| JP | 2014156309 A | 8/2014 |
| KR | 20100006262 A | 1/2010 |
| KR | 20100010430 A | 2/2010 |
| RU | 2429538 C1 | 9/2011 |
| WO | 2014012508 A1 | 1/2014 |
| WO | 2015018309 A1 | 2/2015 |
| WO | WO2015018309 A1 | 2/2015 |

OTHER PUBLICATIONS

Office Action in corresponding Chinese Application No. CN201410168588.1 dated Jul. 27, 2015, 6 pages.
Office Action in corresponding Chinese Application No. CN201410168588.1 dated Feb. 1, 2016, 4 pages.
Office Action in corresponding Chinese Application No. CN201410366721.4 dated Oct. 9, 2015, 6 pages.
Office Action in corresponding Chinese Application No. CN201510037388.7 dated Apr. 1, 2016, 22 pages.
International Search Report for PCT/CN2015/077389 dated Aug. 3, 2015, 2 pages.
The Research of Taxi Dispatch Method and Technology Based on the Distribution and Demand of Passenger, Dec. 15, 2013.
Search Report for EP application No. 15783105.8 dated Aug. 1, 2017, 10 pages.
The Third Office Action for Chinese Application No. CN201510037388.7 dated Dec. 18, 2017, 29 pages.
Office Action for Canadian Application No. CA2946648 dated Aug. 16, 2017, 4 pages.
Notification of Reasons for Refusal in Japanese Application No. 2017-507056 dated Feb. 27, 2018, 10 pages.
Office Action in Russian Application No. 2016145910 dated Apr. 2, 2018, 14 pages.
Notification of Reason for Refusal in Korean Application No. 10-2016-7032658 dated May 2, 2018, 9 pages.

* cited by examiner

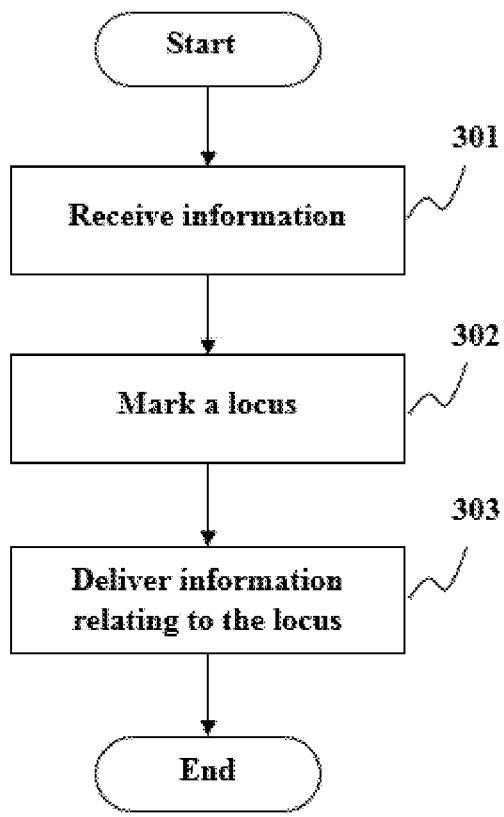
FIG. 3-a

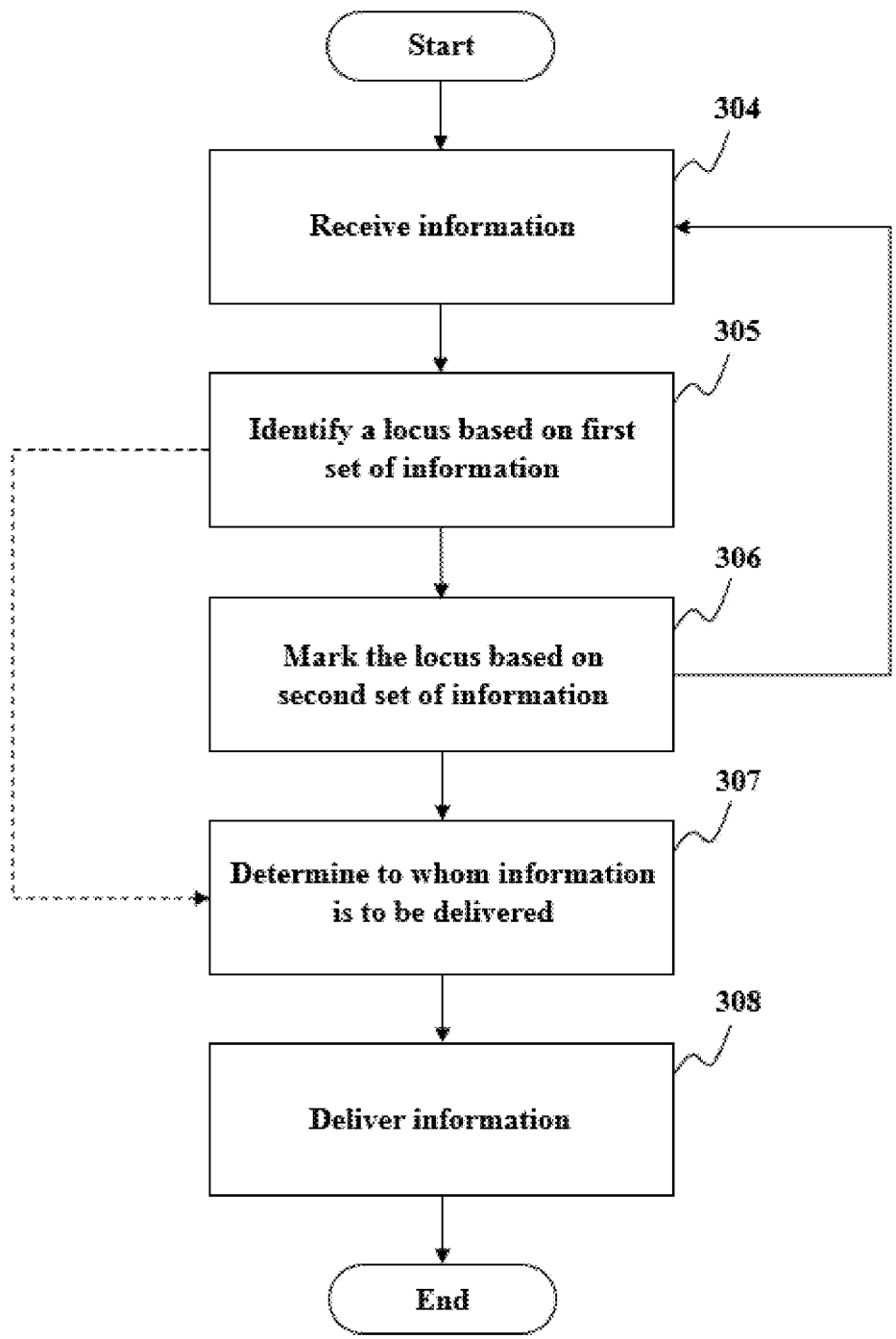
FIG. 3-b

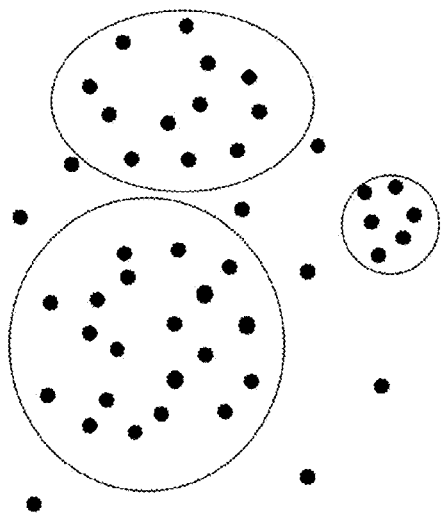
FIG. 10-a
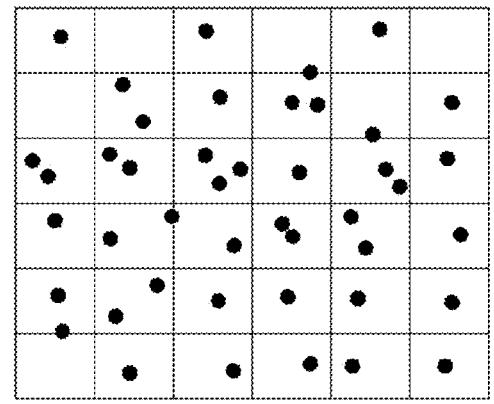
FIG. 10-b
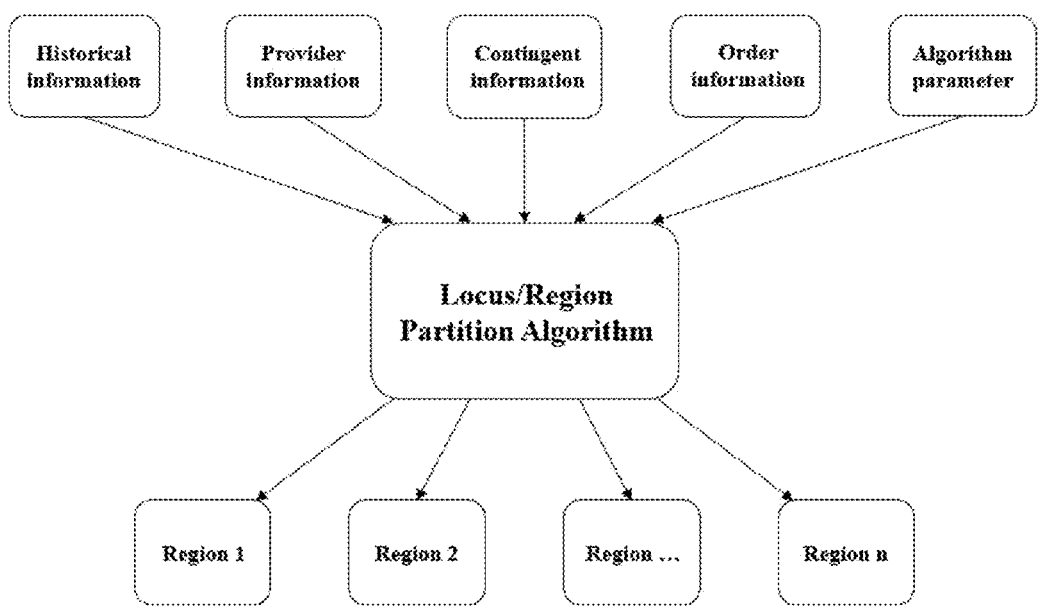
FIG. 11

SYSTEM AND METHOD FOR MANAGING SUPPLY OF SERVICE

CROSS-REFERENCE TO RELATED APPLICATIONS

This application is a continuation of U.S. application Ser. No. 15/306,430, which is U.S. national stage under 35 U.S.C. § 371 of International Application No. PCT/CN2015/077389, filed on Apr. 24, 2015, which claims priority of Chinese Application No. 201410168588.1 filed on Apr. 24, 2014, Chinese Application No. 201410366721.4 filed on Jul. 29, 2014, and Chinese Application No. 201510037388.7 filed on Jan. 23, 2015, the entire contents of each of which are incorporated herein by reference.

TECHNICAL FIELD

This application relates generally to management of supply of service, and in particular, management of supply of service using a network-based, e.g., Internet-based, system and method.

BACKGROUND

On-demand services, such as fleet management systems employed for taxi and limousine fleets, typically use onboard metering devices, radios, and cell phones to dispatch drivers. Such a system typically is not communicative to or does not monitor the distribution of customers that are waiting for pickup.

SUMMARY

This application relates generally to management of supply of service, and in particular, management of supply of service using a network-based, e.g., Internet-based, system and method. A system disclosed herein may identify areas that are under-served or over-served based on the distribution of service requesters, service providers, or the like, or a combination thereof.

In one example, a system having at least one processor, storage, and a communication platform is provided for managing supply of service. The system includes a collection module configured to receive a plurality of orders for a service, an identification module configured to mark a locus based on the plurality of orders, and a determination module configured to identify at least one provider of the service to whom information relating to the marked locus is to be delivered. The marked locus relates to a first number of orders of the plurality of orders, the first number of orders sharing a first characteristic. The marked locus relates to a first location. The first characteristic may be that a distance between the first location and a location relating to an order of the marked locus is less than a first threshold. The collection module may be configured to receive at least one piece of information selected from the group consisting of, e.g., an order location relating to an order of the plurality of orders, a provider location relating to a provider, an order acceptance rate relating to the plurality of orders, an order acceptance rate relating to the marked locus, a traffic condition relating to the marked locus, a road condition relating to the marked locus, a weather condition relating to the marked locus, and historical information relating to the marked locus.

The collection module may further include a location information collector configured to identify the order location relating to an order of the plurality of orders. The location information collector may include a receiver configured to communicate with a positioning device relating to the order. In one embodiment, at least one order of the plurality of orders includes location information of a user. The location information may be determined based on a positioning signal from a device associated with the user. At least one order of the plurality of orders may be received through a network, e.g., the Internet.

The identification module may be configured to identify a locus. The locus may be identified based on one or more cluster algorithm. The identification module may include at least one unit selected from e.g., a historic information processor, and an order information processor, a provider information processor, a contingent information processor, or the like, or a combination thereof. The order information processor or the provider information processor may include at least one unit selected from e.g., a location information processor, a distance calculator, a time calculator, a miscellaneous information unit, or the like, or a combination thereof. The information processor may include at least one unit selected from, e.g., a location information processor, a distance calculator, a time calculator, a miscellaneous information unit, or the like, or a combination thereof. The cluster algorithm may include CLARANS, PAM, CLATIN, CLARA, DBSCAN, BIRCH, OPTICS, WaveCluster, CURE, CLIQUE, K-means algorithm, hierarchical algorithm, or the like, or a combination thereof. The identification module may be further configured to identify a second number of providers relating to the marked locus. The second number of providers share a second characteristic. The second characteristic may be that a distance between the first location and a location relating to a provider of the second number of providers is less than a second threshold. In one embodiment, the first characteristic (that the distance between the first location and a location relating to an order of the first number of orders is less than a first threshold) and the second characteristic may be the same, and the first threshold and the second threshold may be the same. The first number of orders and the second number of providers may be located in the same locus or region. The identification module may be configured to mark the locus based on a determination based on the ratio of the first number to the second number. For instance, the identification module may be configured to mark the locus based on the determination that the ratio of the first number to the second number exceeds a third threshold. In another embodiment, the identification module is further configured to identify an area. The identification module may be configured to mark locus based on one or more orders relate to the area. In another embodiment, the identification module may be configured to identify or mark the locus based on a determination that the first number or the second number exceeds a fourth threshold. In an embodiment, an area may be identified as a locus, and be marked such that the information relating to the marked locus is delivered to one or more requesters, one or more providers, or the like, or a combination thereof. The criteria for identifying a locus may be the same as the criteria for marking a locus. Merely by way of example, an area is identified as a locus if the number of orders with the area reaches or exceeds a threshold. The identified locus is marked such that the information relating to the marked locus is delivered to one or more requesters, one or more providers, or the like, or a combination thereof. In another embodiment, an area may be identified based on a first criterion (or criteria), and the identified locus that satisfies a second criterion (or criteria) is marked such that the information relating to the marked locus is delivered to one or more requesters, one or more providers, or the like, or a combination thereof. The first criterion (or criteria) may be different from the second criterion (or criteria). Merely by way of example, an area is identified as a locus if the number of orders with the area reaches or exceeds a threshold. The identified locus is marked if the ratio of the number of orders within the area to the number of providers within the same area exceeds another threshold. The information relating to the marked locus is delivered to one or more requesters, one or more providers, or the like, or a combination thereof.

The determination module may be configured to determine to whom the information relating to a marked locus is delivered. The determination module may include at least one unit selected from e.g., a historic information processor, and an order information processor, a provider information processor, a contingent information processor, or the like, or a combination thereof. In still another embodiment, the system further comprises a delivery module configured to deliver the information relating to the marked locus to a requester relating to an order of the marked locus, or to the at least one provider.

In another example, a system having at least one processor is provided. The at least one processor performs the operations including, e.g., receiving a plurality of orders for a service; marking a locus based on the plurality of orders, the marked locus relating to a first number of orders of the plurality of orders, the first number of orders sharing a first characteristic, and the marked locus relating to a first location; and identifying at least one provider of the service to whom information relating to the marked locus is to be delivered. The system is adapted for managing supply of the service. The first characteristic may be that a distance between the first location and a location relating to an order of the marked locus is less than a first threshold. In one embodiment, the system may perform the operations of communicating with a positioning device relating to an order of the plurality of orders; and identifying the order location relating to the order. In another embodiment, the system may perform, by or on the at least one processor, the operations of receiving at least one order from a network. In a further embodiment, the system may perform, by or on the at least one processor, the operation of identifying the marked locus based on at least one cluster algorithm. Exemplary cluster algorithm is described elsewhere in the present teachings. In still another embodiment, the system may perform, by or on the at least one processor, identifying a second number of providers relating to the marked locus. The second number of providers may share a second characteristic. The second characteristic may be that a distance between the first location and a location relating to a provider of the second number of providers is less than a second threshold. In one embodiment, the first characteristic (that the distance between the first location and a location relating to an order of the first number of orders is less than a first threshold) and the second characteristic may be the same, and the first threshold and the second threshold may be the same. The first number of orders and the second number of providers may be located in the same locus or region. The marking the locus may including determining the ratio of the first number to that second number. For instance, the locus is marked when the ratio of the first number to the second number exceeds a third threshold. In an embodiment, the marking the locus includes determining that the first number, or the second number exceeds a fourth threshold. In an embodiment, the marking the locus includes determining that the first number, or the second number exceeds a fourth threshold. In an embodiment, the system may perform, by or on the at least one processor, the operations of identifying an area as a locus, and/or marking the locus such that the information relating to the marked locus is delivered to one or more requesters, one or more providers, or the like, or a combination thereof. The criteria for identifying a locus may be the same as the criteria for marking a locus. In another embodiment, an area may be identified based on a first criterion (or criteria), and the identified locus that satisfies a second criterion (or criteria) is marked such that the information relating to the marked locus is delivered to one or more requesters, one or more providers, or the like, or a combination thereof. The first criterion (or criteria) may be different from the second criterion (or criteria). The system may perform, by or on the at least one processor, the operation of delivering the information relating to the marked locus to a requester relating to an order of the marked locus, or to the at least one provider. The delivering may be performed by a device outside of, or independent from the system.

In a further example, a method implemented on at least one processor is provided. The method includes receiving, by or on the at least one processor, a plurality of orders for a service; marking, by or on the at least one processor, a locus based on the plurality of orders, the marked locus relating to a first number of orders of the plurality of orders, the first number of orders sharing a first characteristic, and the marked locus relating to a first location; and identifying, by the at least one processor, at least one provider of the service to whom information relating to the marked locus is to be delivered. The method may include identifying an area as a locus, and/or marking the locus such that the information relating to the marked locus is delivered to one or more requesters, one or more providers, or the like, or a combination thereof. The criteria for identifying a locus may be the same as the criteria for marking a locus. In another embodiment, an area may be identified based on a first criterion (or criteria), and the identified locus that satisfies a second criterion (or criteria) is marked such that the information relating to the marked locus is delivered to one or more requesters, one or more providers, or the like, or a combination thereof. The first criterion (or criteria) may be different from the second criterion (or criteria). The method may include delivering the information relating to the marked locus to a requester relating to an order of the marked locus, or to the at least one provider, or the like, or a combination. The method is adapted for managing supply of the service.

In still a further example, a method implemented on at least one processor is provided. The method includes receiving a first order and a second order, the first order comprising a first order time, a first origin, and a destination, the second order comprising a second order time and a second origin; calculating a first time to reach the destination based on the first order time, the first origin, and the destination; determining a first difference between the destination and the second origin; determining a second difference between the first time and the second order time; and marking, if the first difference is less than a first threshold and the second difference is less than a second threshold, the first order and the second order. The method is adapted for managing the first order and the second order.

Any one of the thresholds described above may be a constant, or a variable. Merely by way of example, a threshold may vary based on, e.g., the time of the day, the day of the week, the road condition, the traffic condition, a specific condition specified by a requester or a provider, or the like, or a combination thereof. A threshold may be a predetermined constant or a predetermined variable. For instance, the threshold may be a variable as a function of time, a function of a contingent condition, or a function of two or more parameters, or the like. The function may be derived from, e.g., historical information using a machine-learning algorithm. An exemplary machine learning algorithm may be one of supervised learning, unsupervised learning, semi-supervised learning, reinforcement learning, or the like, or a combination thereof. An exemplary machine learning algorithm may be c4.5, k-Means, Support Vector Machines (SVM), Apriori, Expectation Maximization (EM), PageRank, AdaBoost, k-Nearest Neighbors (kNN), Naive Bayes, Classification and Regression Tree (CART), or the like, or a combination thereof.

Other concepts relate to software for implementing the present teachings. A software product, in accord with this concept, includes at least one machine-readable non-transitory medium and information carried by the medium. The information carried by the medium may be executable program code data, parameters in association with the executable program code, and/or information relating to a service requester, a service providers, various information relating to the service of interest, the management of supply of the service of interest, etc.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3-a and FIG. 3-b are flowcharts of two exemplary processes in which a scheduling system is deployed, according to an embodiment of the present teachings;

FIG. 10-a and FIG. 10-b illustrate the exemplary diagrams of the loci identification according to one embodiment of present teachings;

FIG. 11 is a diagram illustrating how a locus/region partition algorithm in the identification module input and output according to one embodiment of present teachings;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high level, without detail, in order to avoid unnecessarily obscuring aspects of the present teachings.

The present teachings describe method, system, and programming aspects of a service system to provide service information which identifies areas that are under-served or over-served by service providers. The method and system as disclosed herein aim at identifying the distribution pattern of, e.g., orders, service providers, or the like, or a combination thereof, and mark an area or region where there is a mismatch between the demand and supply of a service, and provide such information to service requesters, service providers, or the like, or a combination thereof. The regions of interest may be identified based on various algorithms or other criteria in different situations with real time and/or historic information, or other information. The efficiency of the service may be improved as service providers or requesters may make adjustments, e.g., moving to different regions or areas to get or provide service, based on this information.

The system and method for managing supply of service may be used in different transportation system (transportation includes but is not limited to land transportation, sea transportation and air transportation, or the like, or a combination there of) including, such as fleet management system employed for taxi and limousine fleets, intra-city express delivery system, or the like. It is understood that these exemplary applications of the system and method disclosed herein are provided for illustration purposes, and not intended to limit the scope of the present teachings. The disclosed system and method may be applied in other contexts, e.g., other on-demand services.

In the present teachings, a "user," a "passenger," a "requester," a "service requester," and a "customer" are used interchangeably to refer to individuals that are requesting or ordering a service. Also, a "provider," a "service provider," and a "supplier" are used interchangeably to refer to an individual, an entity or a tool that may provide a service or facilitate the providing of the service. Also, a "locus," a "cluster," and a "group" are used interchangeably to refer to a group of similar objects sharing a certain characteristic. In some embodiment, a "locus" or a "cluster" may relate to a certain region. Merely by way of example, a locus may refer to a plurality of orders in a region, and may also refer to the region. In some embodiment, a region may relate to a plurality of objects that may be seen as a locus or a cluster.

Figure 1:
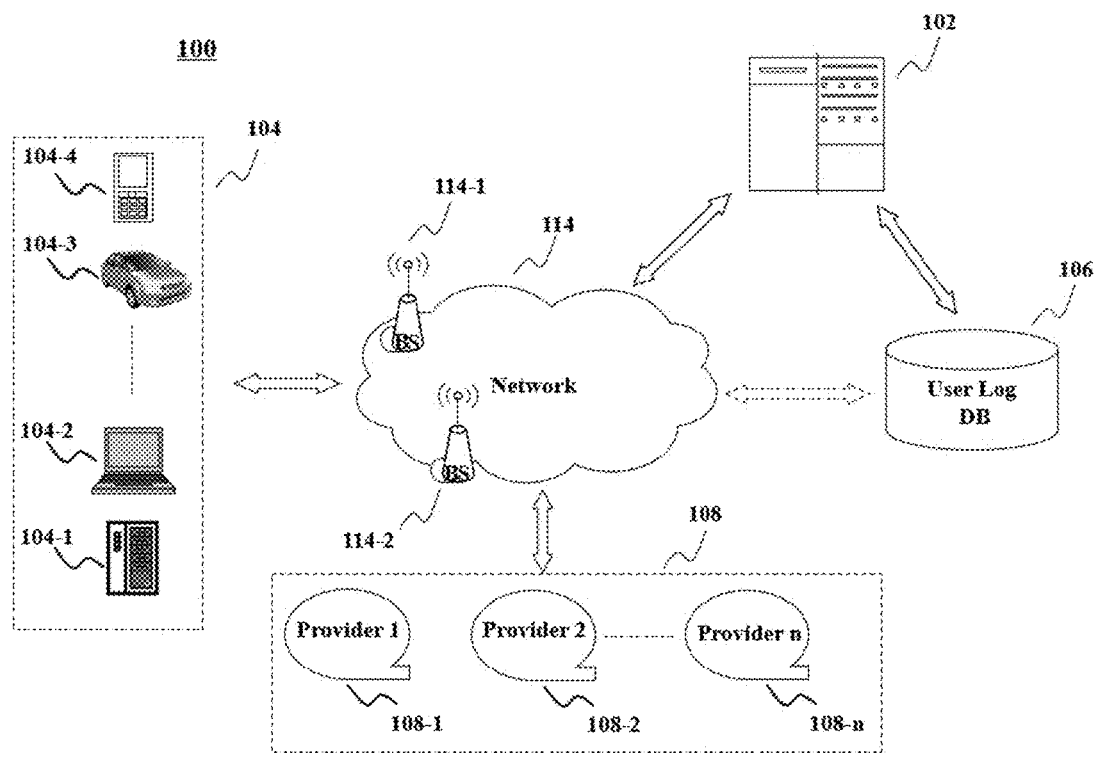
FIG. 1 illustrates an exemplary system configuration in which a scheduling system may be deployed in accordance with various embodiments of the present teachings.

FIG. 1 is a diagram illustrating an exemplary system configuration 100 in which a scheduling system may be deployed in accordance with various embodiments of the present teachings. The exemplary system configuration 100 includes a scheduling system 102, service requesters 104, a user log database (DB) 106, service providers 108, and a network 114. The network 114 may be a single network or a combination of different networks. For example, the network 114 may be a local area network (LAN), a wide area network (WAN), a public network, a private network, a wireless local area network (WLAN), a virtual network, a Metropolitan Area Network (MAN), a Public Telephone Switched Network (PSTN), or any combination thereof. The network 114 may also include various network access points, e.g., wired or wireless access points such as base stations or Internet exchange points 114-1, 114-2 . . . , through which a data source may connect to the network 114 in order to transmit information via the network 114.

The users 104 from whom orders for services may be placed may be of different types, such as users connected to the network 114 via a desktop computer 104-1, a laptop computer 104-2, a built-in device in a motor vehicle 104-3, or a mobile device 104-4. A user or requester may send a request and receive results or suggestions via the network 114. The scheduling system (or referred to as system) 102 may access information stored in the User Log DB (Database) 106 or directly via the network 114.

The User Log DB 106 may be generated by one or more different applications (not shown), which may be running at the backend of the scheduling system, or as a completely standalone system capable of connecting to the network 114, accessing information from different sources, analyzing the information, generating structured information, and storing such generated information. As illustrated in FIG. 1, the User Log DB 106 may be connected to the network 114 and the scheduling system 102. In some embodiments, there is at least one gateway between the User Log DB 106 and the network 114, and an authentication is needed before a user, a provider, or a third party may get access to the User Log DB 106 through the network 114. The service providers 108 may include multiple service providers 108-1, 108-2, 108-n, such as different types of vehicles for hire. For example, a service provider may correspond to a taxi company, a single taxicab, a registered private car, or a vehicle with a registered driver. Various types of service providers have registered with the scheduling system 102 so that they may communicate with the schedule system 102 to exchange information. For example, the scheduling system may access information of service providers, information of service requesters, information of orders for services, or may send notifications or advertisements to service providers, service requesters, or the like, via the network 114.

Figure 2:
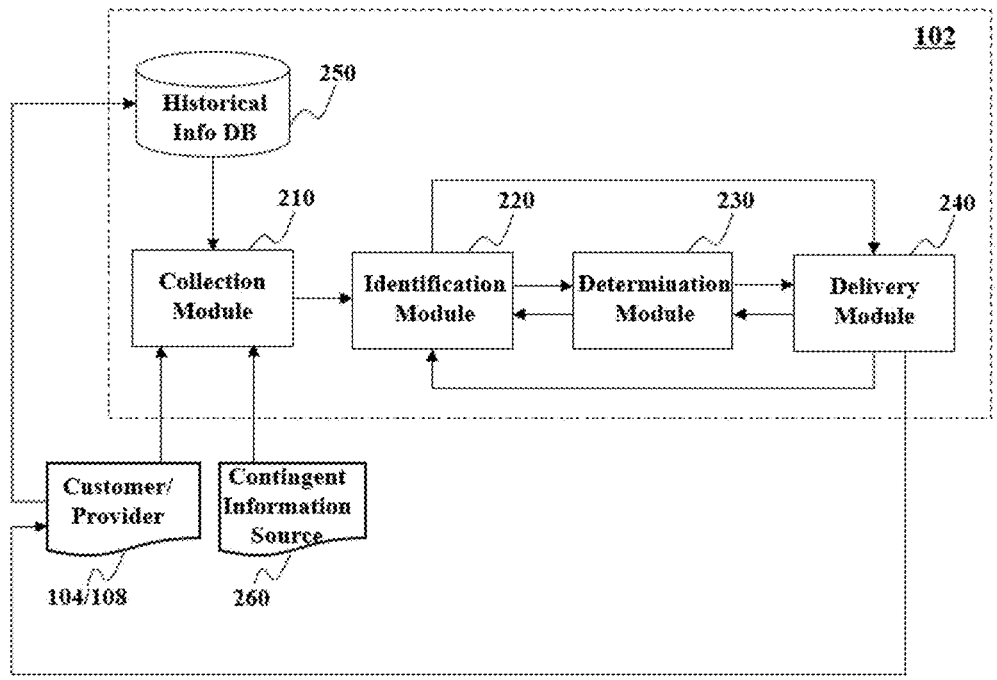
FIG. 2 depicts an exemplary diagram of the scheduling system of the system configuration illustrated in FIG. 1, according to an embodiment of the present teachings.

FIG. 2 is a block diagram of scheduling system 102 of the system configuration shown in FIG. 1. The scheduling system 102 includes a collection module 210, an identification module 220, a determination module 230, a delivery module 240, and a historical information DB 250. The collection module 210 may collect information relating to the requesters 104, the providers 108, or the like, or a combination thereof. The collection module 210 may collect information through the network 114 and/or the User Log DB 106. Also, the collection module 210 may collect contingent information or environmental information from one or more contingent information sources 260. Contingent information may include, but not limited to, a weather condition, a road condition, a traffic condition, a provider-requester ratio, an order acceptance rate, or the like, or a combination thereof. The historical information database (DB) 250 may store historical information relating to, e.g., customers, providers, orders distribution, providers distribution, the demand and supply relationship, or the like, or a combination thereof. The identification module 220 may receive information from, e.g., the collection module 210, and identify or mark loci of orders based on the received information. Information relating to the identified or marked loci of orders may be processed further. Merely by way of example, the identification module 220 may mark whether a locus or region is under-served or over-served, based on order related information, provider related information, contingent information inside or around the locus or region. In one embodiment, information regarding an identified or marked locus or region from the identification module 220 maybe directly sent to the delivery module 240. In another embodiment, the determination module 230 may be configured to receive information from the identification module 220, and identify to whom the information relating to an identified or marked locus or region may be sent. The determination module 230 may send feedback to the identification module 220. Information relating to, e.g., a locus or region is sent to the delivery module 240. The delivery module 240 may deliver information, such as an advertisement, an announcement, or guidance, to requesters, providers, a third party, or the like, or a combination thereof. The information relating to an identified or marked locus or region may also be sent to the determination module 230, the identification module 220, or the historical information DB 250 as feedback, or for backup or storage.

It should be noted that it is possible to implement a different system 102 having more or fewer constituent modules than those of FIG. 2 as needed. While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. Those skilled in the art will recognize that the present teachings are amenable to a variety of modifications and/or enhancements. For example, some of the above-described collection module 210, the identification module 220, the determination module 230, or the delivery module 240 may be embodied in a single module or device, or a single module or device may conduct the functions of two or more of the mentioned modules. For example, a module may be used both to receive related information and to mark a locus, as achieved by the collection module 210 and the identification module 220 described above.

FIG. 3-*a* is a flowchart of an exemplary process in which a scheduling system 102 is deployed, according to an embodiment of the present teachings. Beginning at block 301, information is received. In one embodiment, the received information may include information relating to orders, requesters, providers, historical information, contingent information, or the like, or a combination thereof. In one embodiment, at least some of the received information is real-time information. As used herein, real-time information refers to that at the time or around the time (e.g., within several seconds, within several minutes, etc.) an order is made, or at a time of interest. As used herein, historical (or historic) information may include past information relating to, e.g., the demand or supply of a service (including same or similar services) in an area or region. For instance, the historic information may include the number of orders, the number of providers, the order acceptance rate, the traffic condition, the road condition, or the like, or a combination thereof. The historical information may include information over a period of time. As another example, the historical information may include a profile of any past information exemplified above as a function of time, e.g., the variation at different times within a day (e.g., rush hours, off-peak hours, or the like), for different days of a week, or the like, or a combination thereof. The historical information may be used for predicting or deriving information for a time point later than when the historical information is generated, or when the underlying events associated with the historical information occurred. As used herein, contingent information (or condition) may include information (or condition) that is not controlled by, e.g., a service requester, a service provider, etc., or information (or condition) that is temporary. For example, contingent information (or condition) may include a weather condition, an environmental condition, a road condition (e.g., a road is closed for roadwork or security reasons), a traffic condition, or the like, or a combination thereof. The historical information or the contingent information (or condition) may relate to an order, e.g., the origin of the order, the destination of the order, along a route between the origin and the destination of the order, or the like. In another embodiment, the received information includes, e.g., an order location, a provider location, a time when an order is placed, an order acceptance rate, a traffic condition, a road condition, a weather condition, historic information, or the like, or a combination thereof. At block 302, a locus is marked based on the received information. As described above, this may be performed by an identification module 220 in the scheduling system 102. The marking may be based on information regarding a certain area or region including, e.g., the distribution of orders, the number of orders, the number of service providers, the weather condition, the road condition, the historical information, the traffic condition, or the like, or a combination thereof. At block 303, information regarding the marked locus is delivered to, e.g., one or more requesters, one or more providers, or the like, or a combination thereof.

FIG. 3-*b* is a flowchart of another exemplary process in which a scheduling system 102 is deployed, according to an embodiment of the present teachings. Beginning at block 304, information is received. The collection of information may be performed by a collection module 210 in the scheduling system 102. As described above, the received information may be information relating to orders, requesters, providers, historical information, contingent information, or the like, or a combination thereof. In one embodiment, at least some of the received information is real-time information. At block 305, a locus is identified based on a first set of information relating to a certain area or region. An identified locus may be described that orders sharing at least a same characteristic are grouped together according to an embodiment of present teachings. As described above, this may be performed by the identification module 220 in the scheduling system 102. The first set of information may be a subset of the information received at the collection module 210. The first set of information may include, but be not limited to, information regarding a certain area or region including, e.g., the starting locations (origins) of orders, the destinations of orders, the distribution of orders, the number of orders, the number of service providers, the weather condition, the road condition, historical information, the traffic condition, or the like, or a combination thereof. At block 306, the identified locus is marked based on a second set of information. This may also be performed by the identification module 220. The second set of information may relate to the identified locus. The second set of information may overlap, at least partially, with the first set of information. The second set of information may be a subset of the information received at the collection module 210. The second set of information may include, e.g., the distribution of orders, a certain region or area, the number of orders in the identified locus, the number of service providers in the identified locus, the weather condition, the road condition, the historical information relating to the identified locus, the traffic condition relating to the identified locus, the order acceptance rate in the identified locus, provider-requester ratio in the identified locus, or the like, or a combination thereof. In one embodiment, an identified locus at block 305 may be directly marked or treated as being marked, then it proceeds to block 307 and determines to which service providers and/or requesters the information relating to the marked locus is to be delivered. In one embodiment, the first set of information is the same as the second set of information. In one embodiment, the criterion (or criteria) under which a locus is identified is the same as the criterion (or criteria) under which a locus is marked. An identified locus is marked. In one embodiment, at block 306 the scheduling system 102 determines whether the locus is balanced, under-served, or over-served. Information relating to the marked locus at 306 may be forwarded to block 304, where the information initially received by the collection module 210 may be updated, and/or the identification module 220 may modify or update the information relating to the marked locus. At block 307, a determination is made regarding to which service providers or requesters the information relating to the marked locus is to be delivered. At block 308, the information relating to the marked locus is delivered.

In some embodiments, the information relating to an identified or marked locus may be delivered to one or more service providers, and/or one or more service requesters, or one or more third party, as illustrated in FIG. 3-*a* and FIG. 3-*b*. The information delivered to a service provider may be the same as that delivered to a service requester. Merely by way of example, the information delivered to a service provider and a service requester includes where the locus is, the estimated time for a service provider to reach a service requester or the locus, the location of a service provider or a service requester, the road condition, the weather condition, or the like, or a combination thereof. The information delivered to a service provider may be different from that delivered to a service requester. Merely by way of example, the information delivered to a service provider includes where the locus is, the location of one or more service requesters, and information relating to one or more orders of the locus (e.g., the origin, the destination, the number of passengers, the number of luggage pieces, whether a tip is offered, etc.); the information delivered to a service requester includes whether an adjacent area has more service providers, how long the estimate waiting time is, the weather condition, the road condition, the location of one or more service providers, or the like, or a combination thereof.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. Those skilled in the art will recognize that present teachings are amenable to a variety of modifications and/or enhancements.

Figure 4:
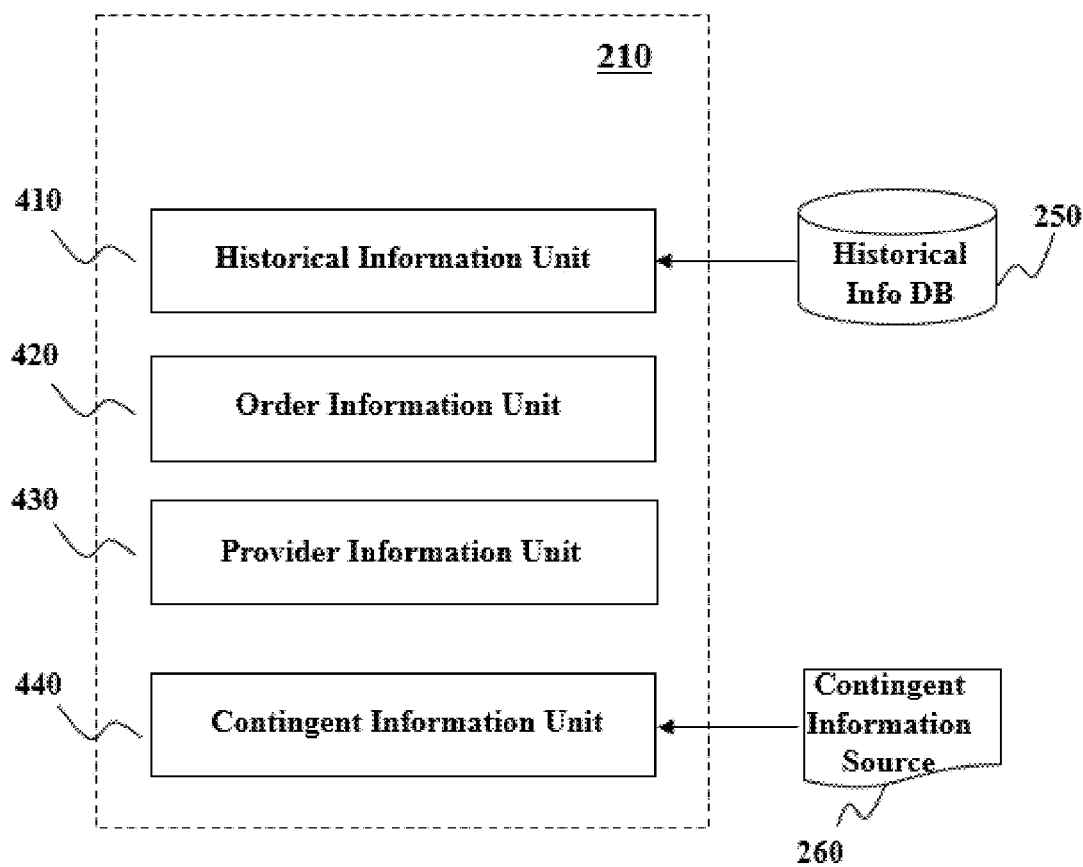
FIG. 4 is a block diagram illustrating an architecture of a collection module according to an embodiment of present teachings.

FIG. 4 is a block diagram illustrating an architecture of the collection module 210 according to an embodiment of present teachings. The collection module 210 includes a historical information unit 410, an order information unit 420, a provider information unit 430, and a contingent information unit 440. It is understood that various modifications may be made thereto and that the subject matter disclosed herein may be implemented in various forms and examples, and that the teachings may be applied in numerous applications, only some of which have been described herein. Those skilled in the art will recognize that present teachings are amenable to a variety of modifications and/or enhancements. For example, some of the described modules or units maybe embodied in a single module or unit, or a single module or unit may conduct the functions of two or more of the mentioned modules or units.

The historical information unit 410 may be configured to receive historical information from, e.g., the user log DB 106 and/or from at least one third party (e.g., service center, etc.). In an embodiment, the historical information unit 410 further includes a historical information DB 250 used for storing and/or processing historical information. As described, historical (or historic) information may include past information relating to, e.g., the demand or supply of a service (including same or similar services) in an area or region and/or over a period of time. The historical information may include, but is not limited to, past and/or recent information, such as the number of requesters in an area or region at a certain time or over a period of time, the time an order was placed, the number of orders, the locations and/or times for pickup by taxis, the extra expense or tip a service requester was willing to pay, special conditions requested in an order (e.g., a lot of luggage, a lot of passengers, a specific type of vehicle, etc.), the requesters' information stored in the user log DB 106 and/or historical information DB 250, the gender, age, driving years or experience of a provider, vehicle age, vehicle type, license plate number, the extra service capacity (e.g., extra features of the vehicle), order number, number of accepted orders, order acceptance rate, requesters' habits, the taxis' location and so on. The historical information may be collected and stored in one or more databases, such as through cloud data storage or locally on a server or computer. The historical information may also come from at least one entity or organization which is, but is not limited to, a commission by government and/or enterprises.

The order information unit 420 may be configured to receive one or more orders from, e.g., requesters and/or from a third party via, e.g., an application or a portal (e.g., a terminal that is configured to communicate with, by way of sending information to and/or receiving information from, the scheduling system via a network). Such an application or portal may be installed on a device, e.g., a smart phone, a desktop, a laptop, or a device described elsewhere in the present teachings or known to those of ordinary skill in the art. Merely by way of example, a third party may make an order for a service on behalf of a passenger or a group of passengers using such an application. The order may include information regarding, e.g., the time an order is placed, the number of taxis, the location for pickup (or origin), the destination, the time for pickup, the contact information, the number of passengers, the number of luggage pieces, the tip that requesters are willing to pay, additional conditions requested relating to the order, whether a driver is needed or not (e.g., the service requester will drive himself or has a driver), or the like, or a combination thereof.

The provider information unit 430 may be configured to receive provider information from, e.g., providers and/or from a third party via, e.g., an application or a portal as described above. The provider information may include, but is not limited to, information specific to a provider and/or a taxi, such as gender, age, driving years or experience of a provider, the number of accepted orders, the order acceptance rate at specific times or over periods of time, the vehicle age, the vehicle type, the capacity of the vehicle, the license plate number, the taxi's location, extra service capacity (e.g., extra features of the vehicle), whether the vehicle is available for use without providing a driver (e.g., the service requester himself will have to drive the vehicle or arrange a driver), or the like, or a combination thereof.

The contingent information unit 440 may be configured to receive contingent information from one or more sources, including, e.g., official news systems (e.g., a weather report system, a real time road conditions system, a broadcast station, etc.) and/or from at least one third party via, e.g., an interface, a portal, an application (e.g., 3D realistic scene by Google map, etc.), or the like, or a combination thereof. In an embodiment, the contingent information includes a contingent information source 260. The contingent information includes, but is not limited to, the information from the contingent information source 260, such as a traffic condition relating to an order or an order locus, the road condition relating to an order or an order locus, the weather condition relating to an order or an order locus, or the like, or a combination thereof. For example, when the weather is rainy, the contingent information unit 440 may receive the "Rainy" information from the contingent information source 260 that may be connected to, e.g., a real time weather forecast system, then the information may be processed or forwarded to another portion of the scheduling system 102, e.g., to the identification module 220.

Figure 5:
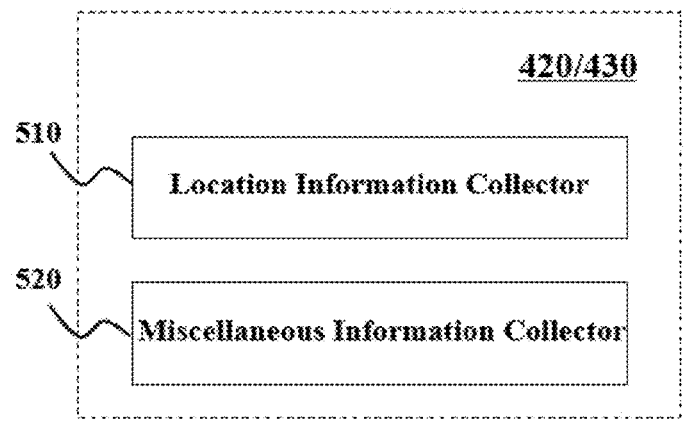
FIG. 5 is a block diagram illustrating an architecture of the order/provider information unit according to an embodiment of present teachings.

FIG. 5 is a block diagram illustrating an architecture of the order/provider information unit 420/430 according to an embodiment of present teachings. The order/provider information unit 420/430 includes a location information collector 510 and a miscellaneous information collector 520. It is understood that various modifications may be made thereto and that the subject matter disclosed herein may be implemented in various forms and examples, and that the teachings may be applied in numerous applications, only some of which have been described herein. Those skilled in the art will recognize that present teachings are amenable to a variety of modifications and/or enhancements. For example, the collectors described above maybe embodied in a single collector, or a collector may conduct the functions of both collectors.

The location information collector 510 may be configured to collect location information from, e.g., a requester or a device associated with the requester, a provider or a device associated with the provider, a third party or a device associated with the third party, or the like. For example, the location information may include the location for pickup, the destination to go, etc.

The miscellaneous information collector 520 may be configured to collect information from requesters and/or from at least one third party accessible application. Miscellaneous information may include information relating to an order (e.g., the time constraint, the number of passengers, the number of luggage pieces, the size of luggage, the location and/or the time of the pickup, the destination, the amount of tip the requester is willing to pay, a passenger's habits or preferences, or the like, or a combination thereof), information relating to a provider (e.g., gender, age, driving years or experience, the vehicle age, the vehicle type, the license plate number, extra service capacity (e.g., extra features of the vehicle), the order number, the number of accepted orders, the order acceptance rate at specific times or over periods of time, the taxis' locations, whether the vehicle is available for self-driving), other input information from a passenger, a provider, or a third party, or the like, or a combination thereof. Miscellaneous information may also include contingent information relating to an order or a locus.

Figure 6:
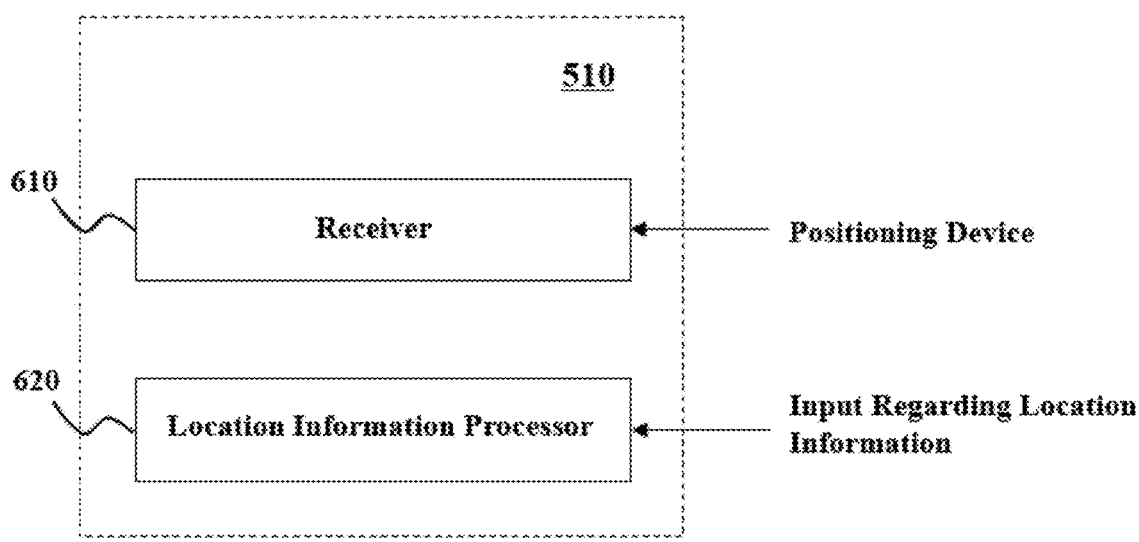
FIG. 6 is a block diagram illustrating an architecture of the location information collector according to an embodiment of present teachings.

FIG. 6 is a block diagram illustrating an architecture of the location information collector 510 according to an embodiment of the present teachings. The location information collector 510 may include a receiver 610 and a location information processor 620. It is understood that various modifications may be made thereto and that the subject matter disclosed herein may be implemented in various forms and examples, and that the teachings may be applied in numerous applications, only some of which have been described herein. Those skilled in the art will recognize that present teachings are amenable to a variety of modifications and/or enhancements. For example, the collectors described above maybe embodied in a single collector, or a collector may conduct the functions of both collectors.

In an embodiment, the receiver 610 may be configured to communicate with one or more positioning devices for receiving location information or location signal. A position device may be, e.g., a smart phone, a global positioning system, a desktop, a laptop, a tablet computer, an in-vehicle computing platform, a cloud computing based portable user platform with location determined services, a personal digital assistant (PDA), a netbook, an ultrabook, a digital photo frame, a media player, a handled gaming console, an ebook reader (e.g., Amazon kindle voyage, etc.), a global navigation satellite system (GLONASS), a Beidou navigation system (BDNS), a Galilio positioning system, a quasi-zenith satellite system (QZSS), a base station (BS), a wearable computing device (e.g., eyeglasses, wrist watch, etc.), a virtual display device, a display enhanced device, a car PC, a car navigation, a radar chronograph, a laser velocimeter, or the like, or a combination thereof. A positioning device may emit or receive a positioning signal that may be used to determine the location of the positioning device or a user of the device. The location information processor 620 may be configured to receive the input regarding location information or identify the location of the received information, such that the geographic or location information (e.g., longitude, latitude, altitude, address, or the like, or a combination thereof) of a requester, a provider, or the like, may be determined. The input regarding location information includes, but is not limited to, location information from a requester, a provider, and/or at least one third party. For example, a requester inputs a location where his/her friend, a passenger, needs to be picked up for a taxi ride, when the passenger doesn't have a device with the positioning function. It is understood that various modifications may be made thereto and that the subject matter disclosed herein may be implemented in various forms and examples, and that the teachings may be applied in numerous applications, only some of which have been described herein. Those skilled in the art will recognize that present teachings are amenable to a variety of modifications and/or enhancements. As used herein, a "taxi" is intended to refer to any means of transportation used to convey passengers or items in return for payment or fare, including but not limited to street taxis that pick up passengers on the street, livery vehicles that respond to prearranged trips, limousines, and delivery services.

Figure 7:
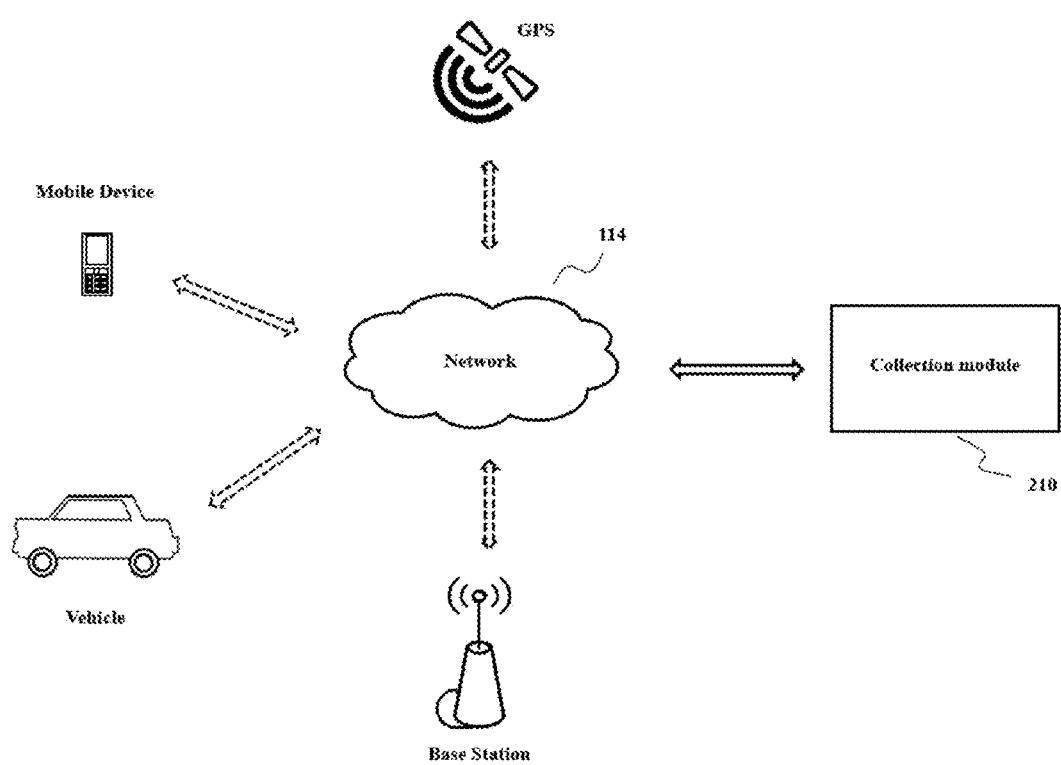
FIG. 7 is a diagram illustrating a collection module configured for receiving information from various sources or devices according to an embodiment of the present teachings.

FIG. 7 is a diagram illustrating a collection module 210 configured for receiving information from various sources or devices according to an embodiment of the present teachings. The collection module 210 may include at least one communication unit that may be configured to receive information and/or one or more databases storing and/or processing related information. The collection module 210 may communicate with one or more positioning devices to receive the related information via the network 114, and/or transmit the received information to other portions of the scheduling system 102, e.g., the identification module 220. The positioning device may include, e.g., a mobile device with the positioning function, a vehicle having at least one positioning module integrated and other instruments to detect the velocity parameter, for example, a smart phone, a personal digital assistant (PDA), a tablet, a laptop, a netbook, a desktop, an in-vehicle computing platform, a cloud computing based portable user platform with location determined services, a personal digital assistant (PDA), a netbook, an ultrabook, a digital photo frame, a media player, a handled gaming console, an ebook reader (e.g., Amazon kindle voyage, etc.), a global positioning system (GPS), a global navigation satellite system (GLONASS), a Beidou navigation system (BDNS), a Galilio positioning system, a quasi-zenith satellite system (QZSS), a base station (BS), a wearable computing device (e.g., eyeglasses, wrist watch, etc.), a virtual display device, a display enhanced device, a car PC, a car navigation, a radar chronograph, a laser velocimeter, or the like, or any combination thereof. A variety of wireless Internet technologies may be used in the network 114, for example, Wireless LAN (WNAN) (Wi-Fi), Wireless broadband (WiBro), World Interoperability for Microwave Access (WiMax), High Speed Downlink Packet Access (HSDPA), and so on. A variety of short range communication technologies may also be used in the network 114, for example, Bluetooth (e.g., iBeacon, etc.), Radio Frequency Identification (RFID), Infrared Data Association (IrDA), Ultra Wideband (UWB), ZigBee, and so on.

Figure 8:
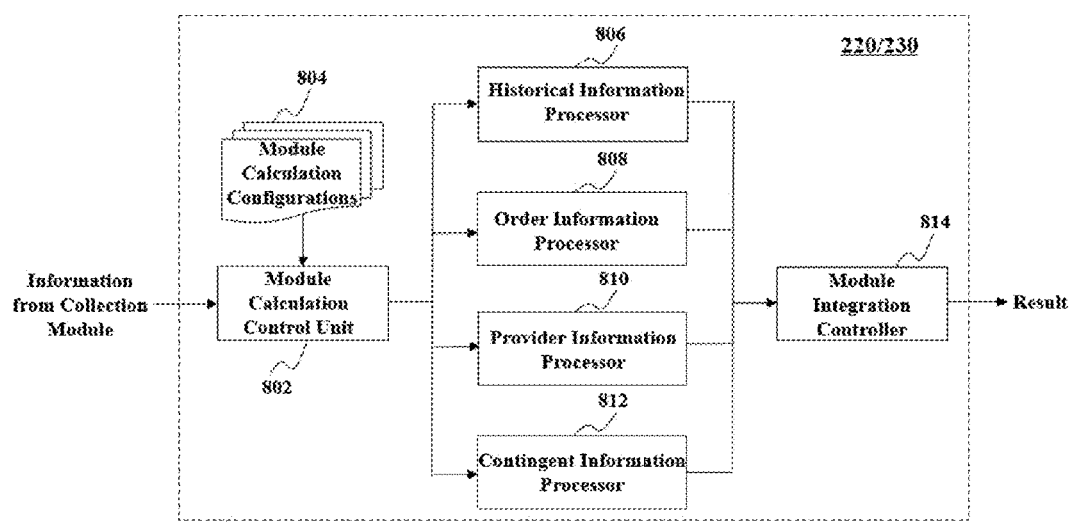
FIG. 8 is a block diagram of the identification module according to an embodiment of the present teachings.

FIG. 8 is a block diagram of the identification module 220 according to an embodiment of the present teachings. The structure and the components of the module in FIG. 8 may be applicable in the context of the identification module 220, and also in the context of the determination module 230. The following description is provided in the context of the identification module 220 for illustration purposes, and is not intended to limit the scope of the present teachings.

In one embodiment, the identification module 220 may be configured to receive information from the collection module 210 and output calculation results. The information from the collection module 220 may include but without limiting to historical information, order information, provider information, contingent information, or the like, or a combination thereof. As shown in FIG. 8, the identification module 220 may include a module calculation control unit 802, a module calculation configurations 804, a historical information processor 806, an order information processor 808, a provider information processor 810, a contingent information processor 812, and a module integration controller 814.

The module calculation control unit 802 may be configured to communicate with the module calculation configurations 804, to receive information from, e.g., the collection module 210, and send the received information for further process in one or more of the historical information processor 806, the order information processor 808, the provider information processor 810, and the contingent information processor 812, or the like, or a combination thereof. The module calculation control unit 802 may control the mode of calculation to be performed, according to instructions retrieved from the module calculation configurations 804. The module calculation configurations 804 may include the instructions regarding calculation to be performed in module calculation control unit 802, historical information processor 806, order information processor 808, provider information processor 810, contingent information processor 812, and module integration controller 814. Merely by way of example, instructions retrieved from the module calculation configurations 804 may determine whether any one of the historical information processor 806, the order information processor 808, the provider information processor 810, and the contingent information processor 812 is involved in a calculation; the calculation sequence between the historical information processor 806, order information processor 808, and provider information processor 810;an algorithm in any one of the historical information processor 806, order information processor 808, provider information processor 810, and contingent information processor 812 to be used; the algorithm-related parameters in any one of the historical information processor 806, order information processor 808, provider information processor 810, and contingent information processor 812; how the intermediate results from any one of the historical information processor 806, the order information processor 808, the provider information processor 810, and the contingent information processor 812 are to be integrated, or the like, or a combination thereof. The instructions may be retrieved from the module calculation configurations 804 by the module calculation control unit 802 based on, e.g., the information received by the collection module 210, including information regarding an order or locus, a provider, a contingent condition, historical information, an instruction regarding the calculation to be performed or algorithm to be used provided by a requester, a provider, a third party, or automatically selected by the system. Merely by way of example, if no historical information is received in connection with a locus, the historical information processor is bypassed in the calculation. As another example, if a requester specifies that a criterion in connection with an order (e.g., a time constraint, a tip to be provided, etc.), a specific algorithm may be retrieved from the module calculation configurations 804 by the module calculation control unit 802 and used to process relevant information. As another example, if a demand/supply is determined based on a historic number of orders in a certain region over a period of time and real time information of the number of providers in the region, the historical information processor and provider information processor both may be involved in processing the information.

The historical information processor 806 may be configured to process historical information. The order information processor 808 may be configured to process order information relating to an order or a locus. The provider information processor 810 may be configured to process information relating to a provider. The contingent information processor 812 may be configured to process contingent information relating to an order or a locus. The historical information processor 806, the order information processor 808, the provider information processor 810, and the contingent information processor 812 each may be an independent computing unit. In another example, at least two of the historical information processor 806, the order information processor 808, the provider information processor 810, and the contingent information processor 812 may share a computing unit with another.

Figure 9:
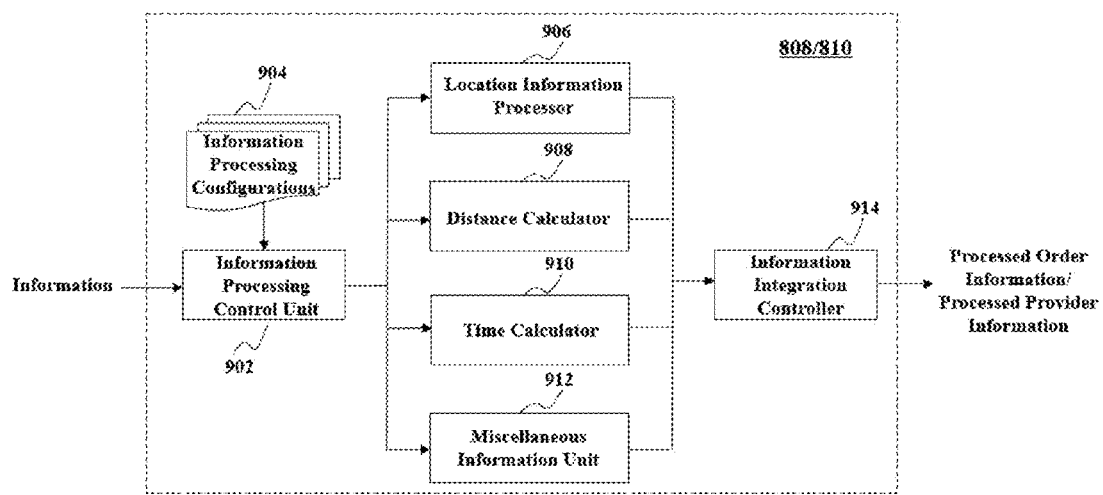
FIG. 9 depicts an exemplary diagram of an order information processor according to an embodiment of the present teachings.

FIG. 9 depicts an exemplary diagram of an order information processor according to an embodiment of the present teachings. The structure of the order information processor in FIG. 9 may be applicable in the context of the provider information processor 810. The order information processor 808 may include an information processing control unit 902. The information process processing control unit 902 may be configured to receive information to be processed, instructions from the information processing configurations 904, or the like, or a combination thereof. The information processing control unit 902 may be configured to control the mode of calculation to be performed, according to instructions retrieved from the information processing configurations 904. The information processing configurations 904 may include the instructions regarding calculation to be performed in various calculators and processing units of the order information processor 808 including, e.g., the location information processor 906, the distance calculator 908, the time calculator 910, and the miscellaneous information unit 912. The location information processor 906 may be configured to process location information, including, but is not limited to, location information from requesters and/or at least one third party. The location information may also include information relating to the starting location (origin), and the destination location (or destination) of an order. The distance calculator 908 may be configured to calculate the distance between two locations. The time calculator 910 may be configured to estimate a time for a service provider/receiver to travel from one location to another based on the distance information, e.g., that calculated by the distance calculator 908. The miscellaneous information unit 912 may be configured to process miscellaneous information from a requester, a provider, a third party, the contingent information, or the like, as described above. The information controller 914 may be configured to integrate information processed by the location information processor 906, the distance calculator 908, the time calculator 910, the miscellaneous information unit 912, or the like, or a combination thereof, to output processed order information. Merely by way of example, the identification module 220 may identify or mark a locus based on traffic information and location information. Thus, the order information processor 808 may configure the information processing control unit 902 by information processing configurations 904 to access location information processor 906 and miscellaneous information unit 912, and information integration controller 914 may process the integrated information and output the result to following module or unit.

Returning to FIG. 8, the historical information processor 806, the order information processor 808, the provider information processor 810, and the contingent information processor 812 may process respective information individually or cooperatively. The four mentioned processors may send respective processed data (or intermediate results) to the module integration controller 814. The four processor modules send information at the same time or at a predetermined sequence.

The module integration controller 814 may be configured to integrate the received or processed data (or intermediate results) and calculate a result based on, the instructions retrieved from the module calculation configurations 804 by the module calculation control unit 802. The module integration controller 814 may be an independent computing unit or a shared computing unit with historical information processor 806, order information processor 808, provider information processor 810, and contingent information processor 812.

The connection type between module calculation control unit 802, module calculation configurations 804, historical information processor 806, order information processor 808, provider information processor 810, contingent information processor 812, and module integration controller 814 may be wired or wireless, all integrated in a circuit or partially integrated in a circuit or distributed in different places.

The identification module 220 may process a plurality of orders, and may identify or mark at least one locus based on various information. The various information may include information relating to orders, requesters, passengers, providers, contingent information, historical information, a certain region or area, or geographic information of a certain region or area, or the like, or a combination thereof. For example, the identification of a locus or region may be based on order distribution by clustering algorithms, or based on region conditions. A locus may include an order set including one or more orders. The orders in the locus are more similar to each other than to those outside of the locus. The orders in the locus share at least one characteristic. Merely by way of example, a shared characteristic may be that a distance between a location relating to the locus (e.g., a reference point or a location within the locus) and a location relating to an order of is less than a threshold. The threshold may be a constant, or a variable. Merely by way of example, the threshold may vary based on, e.g., the time of the day, the day of the week, the road condition, the traffic condition, a specific condition specified by a requester or a provider, or the like, or a combination thereof. The threshold may be a predetermined constant or a predetermined variable. For instance, the threshold may be a variable as a function of time, a function of a contingent condition, or a function of two or more parameters, or the like. The function may be derived from, e.g., historical information using a machine-learning algorithm. Exemplary machine learning algorithm is described elsewhere in the present teachings.

FIGS. 10-a and 10-b illustrate the exemplary diagrams of identifying regions on the basis of which loci may be identified or marked, according to one embodiment of the present teachings. FIG. 10-a is an example of how the orders are grouped or organized into different loci (one elliptical area indicating one locus), and the dots that do not fall within any elliptical area do not belong to any locus. A dot indicates a location relating to an order for a service, e.g., the starting location or origin of an order for a taxi ride.

FIG. 10-b is another example of identification of a certain area based on geographic information. As illustrated in FIG. 10-b, an area (e.g., a city) is divided into 30 m*30 m grids. Let r be an order request from collection module, whose longitude and latitude coordinates are (longitude, latitude). Let the longitude and latitude coordinates of the lower left corner of the map be (leftLongitude, leftLatitude), the width of a gird be width, thus the grid number (gridCx, gridCy) maybe calculated by:

$$gridCx=(int)((longitude-leftLongitude)/width)$$

$$gridCy=(int)((latitude-leftLatitude)/width)$$

It shall be noted that the identification of loci or regions shall not be restricted by the examples described above since they are simply specific embodiments of the present teachings. Those having ordinary skills in the art will recognize that the present teachings are amendable to a variety of modifications and/or enhancements. For example, the division of regions in FIG. 10-b may be amended according to clustering algorithms as described in FIG. 10-a, the width of the grids may be variable according to specific algorithms.

FIG. 11 is a diagram illustrating how a locus/region partition algorithm in the identification module input and output according to the present teachings. Locus/region partition algorithm may be utilized to identify a locus or region based on information which is input and relating to at least one piece of information selected from, e.g., historical information, order information, provider information, contingent information, or the like, or a combination thereof, as described elsewhere in the present teachings.

Information used in the identification module 220 may be stored in one or more storage devices (not shown in figures) inside the scheduling system 102 or outside of the scheduling system 102 (e.g., in a storage provided by a vendor). In some embodiments, the identification module 220 may be configured to receive, e.g., historical information, order information, provider information, contingent information, or the like, or a combination thereof. Such information may be from the collection module 210. The identification module 220 may be configured to identify at least one locus based on the received information and an algorithm. In an embodiment, the region partition algorithm may partition an area (e.g., a city, a district, etc.) into at least one region according to, but not limited to, longitude and latitude, coordinate, position, size of the area, density, and/or grid, as illustrated in FIG. 10-a and FIG. 10-b.

Figure 12:
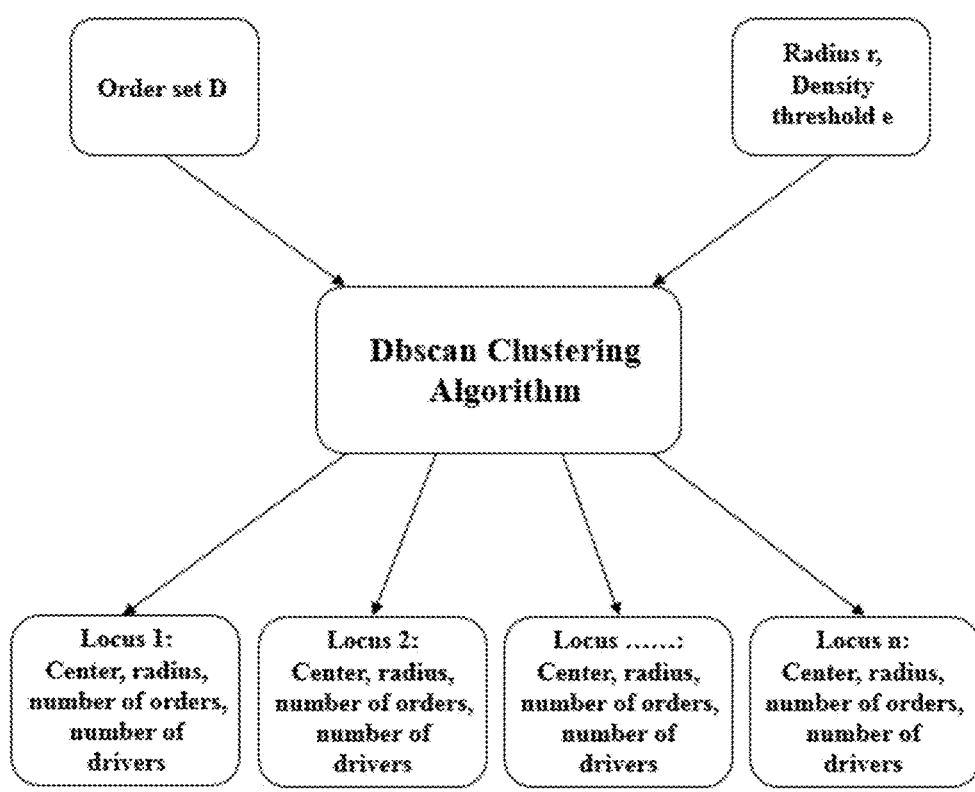
FIG. 12 is another diagram illustrating how a specified region partition algorithm in the identification module input and output according to one embodiment of present teachings.

FIG. 12 is another diagram illustrating an exemplary region partition algorithm in the identification module input and output according to the present teachings. The algorithm illustrated in FIG. 12 is a clustering algorithm. An applicable clustering algorithm may be CLARANS, PAM, CLATIN, CLARA, DBSCAN, BIRCH, OPTICS, WaveCluster, CURE, CLIQUE, K-means algorithm, hierarchical algorithm, or the like, or a combination thereof. In one embodiment, the Dbscan clustering algorithm may define a distance and automatically put all the orders under one certain order locus based on the latitude and longitude of starting location information of all the orders. The orders in a locus may share a same characteristics. For example, each order in a locus is located within a certain distance from another order. As shown in FIG. 12, inputs of Dbscan clustering algorithm include, e.g., order set D, radius r, and parameter e. The order set D is the set of all the orders in a predetermined time period, radius r is to define an order's r region, and density threshold e is the minimum number of orders for a specific order to be determined or defined as a core order in the r region. Based on received inputs order set D, the order set D, and specified parameters (radius r and density threshold e), the identification module outputs at least one identified locus (or referred to as order locus). According to an embodiment of present teachings, the Dbscan clustering algorithm is applied to calculate at least one order locus in a time period based on the order set D of the time period. The order set D may include: the respective order numbers, the respective starting locations (by way of, e.g., latitude and longitude of starting location), the respective starting times, or the like, or a combination thereof. The specified radius r and density threshold e utilized in the clustering algorithm may be modified depending on different conditions, such as historical information, information provided by one or more requesters, or contingent information.

Figure 13:
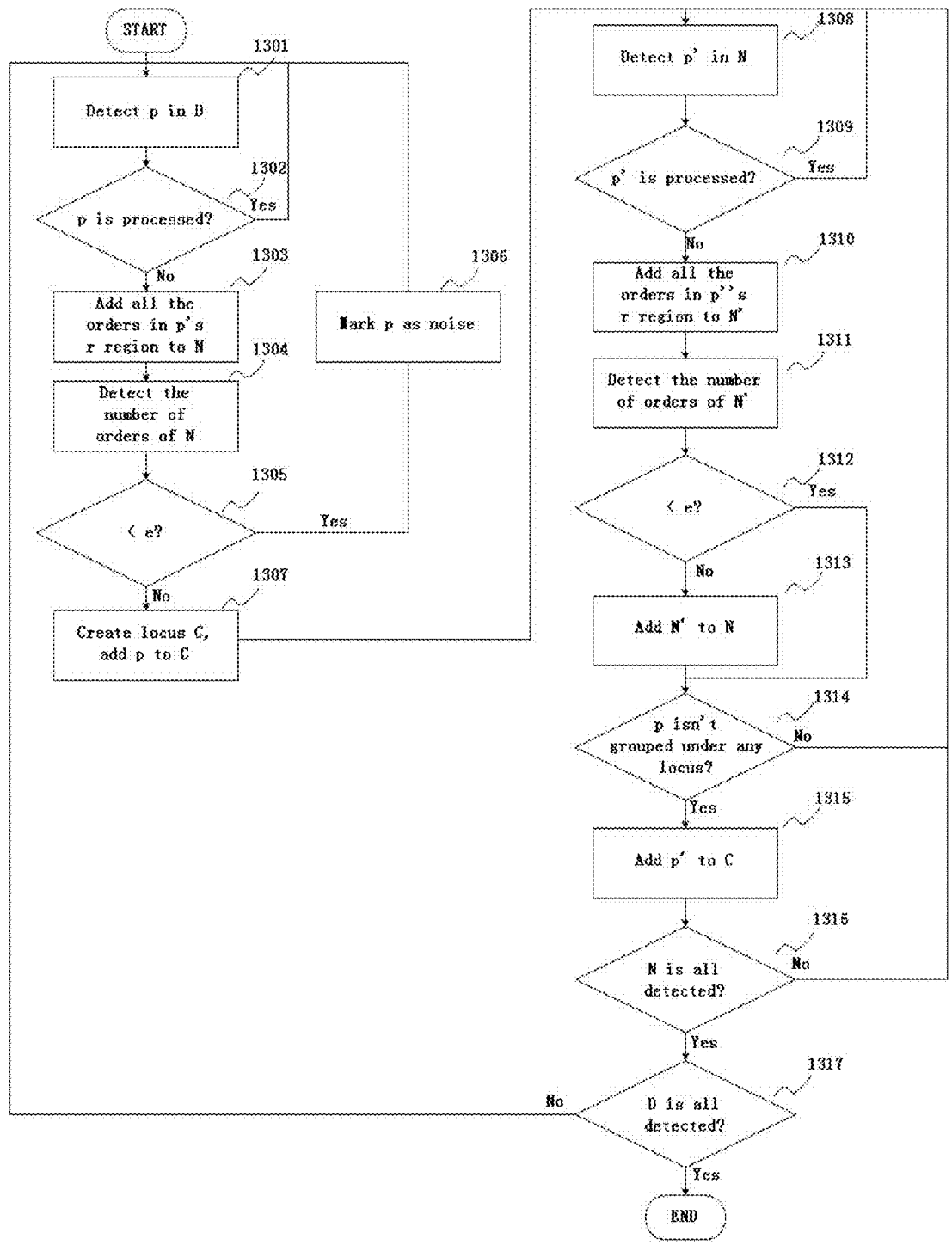
FIG. 13 is a flowchart diagram of the Dbscan clustering algorithm according to another embodiment of present teachings.

FIG. 13 is a flowchart diagram of an exemplary application of Dbscan clustering algorithm according to an embodiment of the present teachings. A vehicle order set D is the set of orders for vehicle services within a city in a time period (e.g., a predetermined time period), and the information in an order of the order set includes: order number (ID),latitude and longitude of starting location, starting time and etc.; radius r is determined by experience, generally 1~5 km; density threshold e is generally 1/10~1/50 of all the vehicle orders in current city; each locus C is one of the order loci in one certain city at current moment. The time period may be 5 minutes, 10 minutes, 15 minutes, 20 minutes, 25 minutes or 30 minutes; the refresh time of information is 5 seconds, 10 seconds, 15 seconds, 20 seconds, 25 seconds or 30 seconds.

Merely by way of example, the Dbscan clustering algorithm includes the following steps:

Step 1, at block 1301, detecting order p in order set D; at decision block 1302, determining whether the order p in order set D is processed. If order p is grouped under one certain locus or is marked as noise, which means p is processed, then returning to block 1301, detecting the next order in D. If order p is not processed, then proceeding to block 1303, adding all the orders in order p's r region (if the distance between the latitude and longitude of starting location of one certain order and the latitude and longitude of starting location of order p is less than radius r, the order is considered as an order in order p's r region) to candidate set N.

Step 2, at block 1304, detecting the number of orders in candidate set N, at decision block 1305, determining whether the number of orders of order set N is less than e. If the number of orders in order set N is less than e, proceeding to block 1306, marking order p as noise, then returning to block 1301, and detecting the next order in D. If the number of orders in order set N is equal to or more than e, then proceeding to block 1307, creating a new locus C and adding order p to locus C.

Step 3, at block 1308, detecting order p' in candidate set N, at decision block 1309, determining whether the order p' in N is processed. If order p' is grouped under one certain locus or is marked as noise, which means p' is processed, then returning to block 1308, detecting the next order in N. If order p' is not processed, then proceeding to block 1310, adding all the orders in order p's r region to candidate set N'. At block 1311, detecting the number of orders of order set N'; at decision block 1312, determining whether the number of orders of order set N' is less than e. If the number of orders of order set N' is equal to or more than e, then proceeding to block 1313, adding orders N' to N; at decision block 1314, determining whether p is grouped under any locus. If order p' is not grouped under any locus, then proceeding to block 1315, adding order p' to locus C.

Step 4, at decision block 1316, determining whether order set N is all detected. If N is not all detected, then returning to block 1308, detecting next order in N, repeating step 3, until order set N is all detected. If N is all detected, then proceeding to decision block 1317.

Step 5, at decision block 1318, determining whether order set D is all detected. If D is not all detected, then returning to block 1301, detecting next order in D, repeating step 1-3, until order set D is all detected. If D is all detected, then proceeding to END.

Thus, after Dbscan algorithm clustering, outputting a plurality of loci, each of which may include orders relating to a certain location.

Dbscan clustering algorithm pseudo-code may be described as follows:

```
Dbscan (D,r,e)
Begin
Init C = 0;
For each unvisited point p in D
Mark p as visited;
N = getNeighbours (p,r);
If sizeOf(N) < e then
Mark p as Noise;
else
C = next cluster;
ExpandCluster (p, N, C, r, e);
end if
end for
End
```

The ExpandCluster algorithm pseudo-code may be described as follows:

```
ExpandCluster(p, N, C, r, e)
add p to cluster C;
for each unvisited point p' in N
mark p' as visited;
 N' = getNeighbours (p', r);
if sizeOf(N') >=e then
  N = N+N';
 end if
 if p' is not member of any cluster
 add p' to cluster C;
 end if
 end for
End ExpandCluster
```

Furthermore, based on the orders in a locus, parameters including, e.g., the locus center, the radius, the number of providers, the number of orders in the locus, or the like, or a combination thereof, may be calculated.

Merely by way of example, based on the latitude and longitude of all the orders in the locus, the latitude and longitude of the locus center may be calculated using mean value. After obtaining latitude and longitude of the locus center, the distance between the latitude and longitude of the locus center and latitude and longitude of each order in the locus may be calculated, and the maximum value of the distance maybe taken as the radius of the region. The number of orders in the region is the total number of all the orders in the locus. Number of providers in the region is determined as: calculating the distance between latitude and longitude of the locus center and each providers, and counting the number of the providers whose distance are less than the radius of the region.

Thus, one or more order loci may be identified in a certain area (e.g., in a certain city), for example, locus 1 is described with center coordinate xy (latitude and longitude of the locus center), radius r, number of orders n, number of providers m; locus 2 is described by center coordinate xy', radius r', number of orders n', number of providers m', etc.

Based on the order information in one certain order locus, the identification module 220 may be configured to calculate, e.g., the number of orders in the order locus, the location (by way of, e.g., latitude and longitude) of the locus center, radius of the locus, or the like, or a combination thereof. As used herein, the number of orders in the locus is the total number of orders in the order locus; the latitude and longitude of the locus center is the average value of all the latitude and longitude of the locus; and the radius of the locus is the maximum value of the distance between the latitude and longitude of the locus center and latitude and longitude of starting location of each order in the order locus. There are other ways to define the location of the locus center. The description provided above is for illustration purposes, and is not intended to limit the scope of the present teachings. The orders in the locus may be closer to each other than orders outside of the locus. A locus so identified may have a concentration of orders for a service (or the same or similar services).

In one embodiment, the identification module 220 may be configured to further mark an identified locus if the locus meets a certain criterion indicating a mismatch of the demand for service within the identified locus and the supply of the service within the identified locus. The determination may be made based on, e.g., the information received from the collection module 210, or information processed by the historical information processor 806, the order information processor 808, provider information processor 810, and/or contingent information processor 812. The information may include historical information, order information, provider information, or contingent information, or the like, or a combination thereof. For example, the information may include that relating to the identified locus, including e.g., an order location, a provider location, an order acceptance rate, an order acceptance rate, a traffic condition, a road condition, a weather condition, and historical information, or the like, or a combination thereof. In an embodiment, a provider-requester ratio and the order acceptance rate relating to the identified locus are calculated. In one example, an identified locus that meets a certain criterion is further marked as an "under-served" locus, where more service providers are needed. In another example, a provider-requester ratio, a factor relating to the road condition, a factor relating to the traffic condition are calculated. Based on the calculated parameter(s), an identified locus that meets a criterion is further marked as "under-served" locus.

Figure 14:
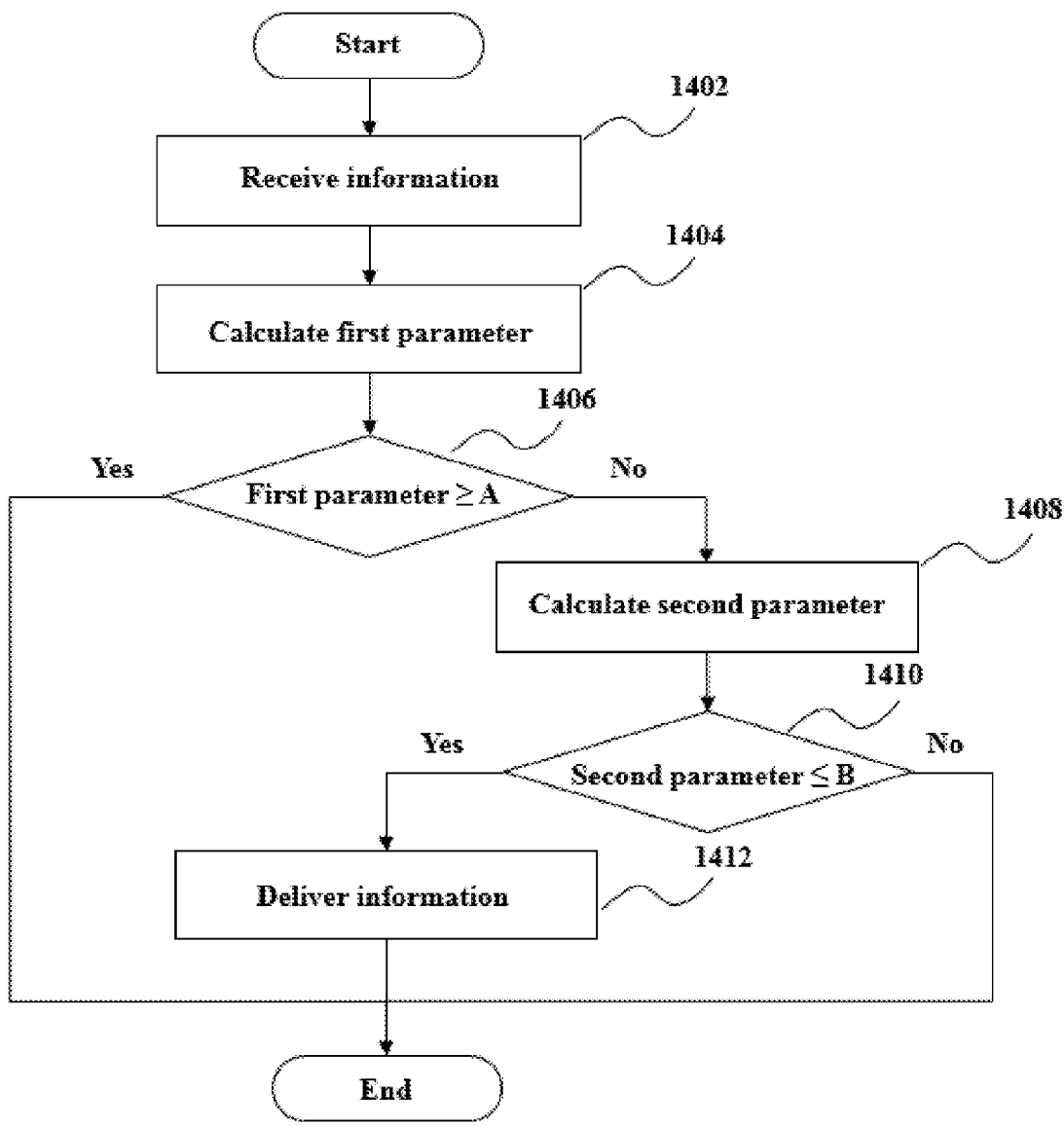
FIG. 14 is a flowchart illustrating the identification module for further marking the locus according to an embodiment of the present teachings.

FIG. 14 is a flowchart for marking the locus as whether under-served or not according to an embodiment of the present teachings. The marking may be performed in the identification module 220. Beginning at block 1402, information relating to a locus is received. At block 1404, a first parameter is calculated based on the received information. The first parameter may be a number (e.g., the number of orders within a locus), a ratio (e.g., the order acceptance rate, a ratio of the number of providers in a locus to the number of orders in the locus (provider-requester ratio), etc.), or a contingent factor (e.g., a factor relating to the weather condition, a factor relating to the traffic condition, etc.), or the like, or a combination thereof. At block 1406, the first parameter in a locus compares to a first threshold to determine whether the locus is marked. Merely by way of example, if the first parameter is the order acceptance rate, then the threshold A may be set at 80%, the locus is not further marked if the order acceptance rate exceeds the threshold (i.e. the locus is in good condition as is). If the parameter is lower than the first threshold, then the identification module 220 proceeds to block 1408. The first threshold may be a constant, or a variable. Merely by way of example, the first threshold may vary based on, e.g., the time of the day, the day of the week, the road condition, the traffic condition, a specific condition specified by a requester or a provider, or the like, or a combination thereof. The first threshold may be a predetermined constant or a predetermined variable. For instance, the first threshold may be a variable as a function of time, a function of a contingent condition, or a function of two or more parameters, or the like. The function may be derived from, e.g., historical information using a machine-learning algorithm. Exemplary machine learning algorithm is described elsewhere in the present teachings. At block 1408, a second parameter is calculated. The second parameter may also be a ratio (e.g., the order acceptance rate, the ratio of the number of providers within the locus to the number of orders within the locus, etc.), or a contingent factor (e.g., a factor relating to the weather condition, a factor relating to the traffic condition, etc.). The second parameter may be different from the first parameter. At block 1410, the second parameter is compared to a second threshold. Merely by way of example, for a locus whose first parameter is less than the first threshold A (e.g., the order acceptance rate is lower than the first threshold A set to be 80%), at block 1410, if the provider-requester ratio is below the second threshold B (e.g., the provider-requester ratio is lower than the second threshold B set to be 10), to the locus is marked at block 1412 indicating that the supply of service is insufficient to satisfy the demand for service in the locus. The locus is marked such that the information regarding the mismatch of the demand and supply in the locus is to be delivered. The second threshold may be a constant, or a variable. Merely by way of example, the second threshold may vary based on, e.g., the time of the day, the day of the week, the road condition, the traffic condition, a specific condition specified by a requester or a provider, or the like, or a combination thereof. The second threshold may be a predetermined constant or a predetermined variable. For instance, the second threshold may be a variable as a function of time, a function of a contingent condition, or a function of two or more parameters, or the like. The function may be derived from, e.g., historical information using a machine-learning algorithm. Exemplary machine learning algorithm is described elsewhere in the present teachings.

Those having ordinary skills in the art will recognize that the present teachings are amendable to a variety of modifications and/or enhancements. For example, at least one parameter is necessary in the module to determine whether a locus shall be further marked. In some embodiments, more than two parameters shall also be implementable to further mark a locus.

The determination module 230 may be configured to determine to whom the information relating to a marked locus is to be delivered. As illustrated in FIG. 8, the determination module 230 may be similar to the identification module 220 described above. In one embodiment, the determination module, or a portion of the determination module (e.g., a distance calculator of the provider information processor of the determination module) may be configured to calculate a distance between the first location relating to a marked locus and a location relating to a provider.

The distance may provide the basis to determine to whom the information relating to a marked locus is delivered. Merely by way of example, the information relating to a marked locus is delivered to a provider if the distance between the location of the provider and the first location (e.g., the location relating to the marked locus) is less than a threshold. In another embodiment, the determination module, or a portion of the determination module (e.g., a time calculator of the provider information processor of the determination module) may be configured to calculate a time for at least one provider to travel to the first location (e.g., the location relating to the marked locus). To calculate the time, the time calculator may use, e.g., the information relating to the location relating to the provider and the first location (e.g., the location relating to the marked locus) or the distance between the two locations, contingent information (e.g., the road condition, the traffic condition, various routes available between the two locations, etc.), the condition of the vehicle the provider is using, or the like, or a combination thereof. The time may provide the basis to determine to whom the information relating to a marked locus is delivered. Merely by way of example, the information relating to a marked locus is delivered to a provider if the time is less than a threshold. The determination module may be configured to determine whether to deliver the information relating to a locus to a requester. The threshold described above may be a constant, or a variable. Merely by way of example, the threshold may vary based on, e.g., the time of the day, the day of the week, the road condition, the traffic condition, a specific condition specified by a requester or a provider, or the like, or a combination thereof. The threshold may be a predetermined constant or a predetermined variable. For instance, the threshold may be a variable as a function of time, a function of a contingent condition, or a function of two or more parameters, or the like. The function may be derived from, e.g., historical information using a machine-learning algorithm. Exemplary machine learning algorithm is described elsewhere in the present teachings.

Figure 15:
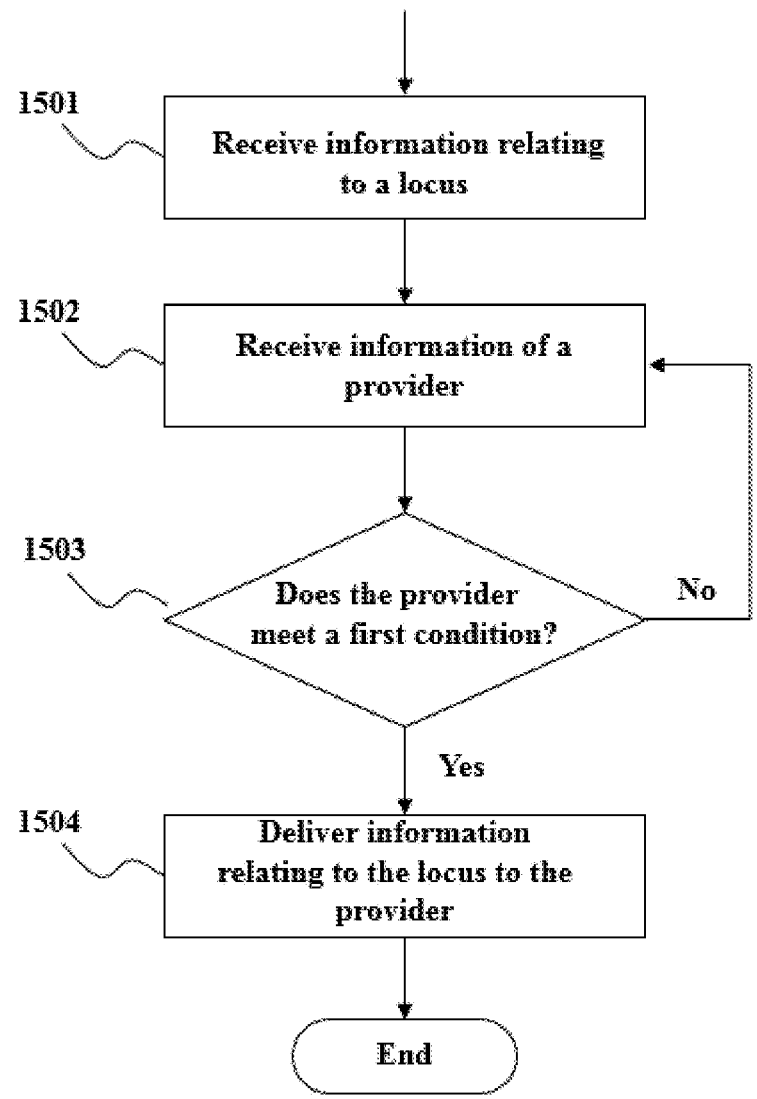
FIG. 15 is a flowchart of an exemplary process of delivering advertisement to service providers, according to an embodiment of the present teachings.

FIG. 15 is a flowchart of an exemplary process of determining to which service provider(s) the information relating to a marked locus is to be delivered, according to an embodiment of the present teachings. Beginning at block 1501, information relating to a locus is received. The locus may be a marked locus. In an embodiment, the information relating to the marked locus includes, but is not limited to, the locus center, the locus radius, the order acceptance rate, the origin of the destination of an order, or the like, or a combination thereof. In one embodiment, the information relating to the marked locus may further include historical information of the locus, a contingent condition (e.g., the traffic condition, the road condition, the weather condition, etc.), or the like, or a combination thereof. At block 1502, information relating to a service provider is received. In an embodiment, the provider related information includes, but not limited to, position of the taxi. In an embodiment, the provider related information further includes driver's ID, reporting time, the status of the taxi, or the like, or a combination thereof. At block 1503, if the provider related information meets a criterion (or criteria) (i.e. the first condition as illustrated in FIG. 15), advertisement related to the marked locus is delivered to the provider at block 1504. If the provider related information does not meet the criterion (or criteria), it may go to the end block or return to block 1502 to receive information of another service provider. In an embodiment, the criterion (or criteria) correlate(s) with parameters including, e.g., the position of the provider, the locus area, or the like, or a combination thereof. For example, the criterion (or criteria) may be that if the distance between the provider and the nearest locus is within the interval (r', r'+d), meaning the distance is equal to or more than r', while equal to or less than r'+d. Here, r' is the radius of the marked locus, d is a predetermined value. For instance, d may be set to be a value between 0.5 km and 2 km. The position of the provider and distance between the provider and the locus may be provided by, e.g., the distance calculator 908, or by respective units or parts included in other modules described above.

In one embodiment, the delivery module may be configured to deliver the information relating to the marked locus to various recipients including, e.g., providers around marked loci. At block 1504, information relating to the marked locus (e.g., in the form of advertisement or notification) is delivered to the providers that satisfy the first condition. According to an embodiment of the present teachings, the advertisement to schedule or encourage providers from an outside region to the marked locus may be realized by several methods or any combination of them. For example, information delivered to one or more providers from a region outside of a locus may include at least one piece of information selected from, e.g., the number of shortage in providers in a locus in a period of time, a locus marked as over-served or under-served, the distance between the provider's position and a marked locus, an estimated time for the provider to reach the marked locus or an order within the locus, a route (e.g., a faster route, a route without toll, etc.) that the provider may use to reach the marked locus or an order within the locus, a suggested route, or the like, or a combination thereof. For inconvenient traffic area, traffic information may be delivered to the providers. Alternative information, such as road administration reconstructive area, may also be delivered to the providers to indicate the road condition. In another example, the advertisement may be a distribution diagram showing the density distribution of providers/passengers with different colors or whatever distinguishable patterns. In another example, the advertisement may be accompanied by changing the pricing standard for service in the marked locus, and the pricing standard may also be sent to requesters so that requesters and providers may reach an agreement in advance. In one embodiment, some information relating to the marked locus is delivered to a requester within the locus. Merely by way of example, if an adjacent region has more providers than where the requester is, this information may be delivered to the requester. The requester may also receive information regarding a fast route to get to the adjacent area, the distance that the requester needs to travel, the road condition, the traffic condition, or the like, or a combination thereof. Information delivered to one or more providers, one or more requesters, etc., may be delivered in the format of, e.g., a text message, a voice message, graphic information that may be displayed on a screen, an animation, or the like, or a combination thereof. The recipient of the information, e.g., a provider, a requester, etc., may specify the content of the information to be delivered, the format the information may be presented, the device to which such information is to be delivered, or the like, or a combination thereof.

Those skilled in the art will recognize that present teachings are amenable to a variety of modifications and/or enhancements. For example, the information of a service provider maybe received before the information relating to a marked locus being received, or the two set of information maybe received simultaneously or essentially simultaneously. In another example, the information relating to a marked locus may be delivered if two or more conditions are met. For example, a first condition may be if the distance between the provider and any locus region center (or locus center) is more than the radius of the locus (indicating that the provider is not in any of the loci). A second condition may be if the distance between the provider and the nearest locus is on the interval (R, R+D) (which means the distance is equal to or more than R, while equal to or less than R+D), wherein R is a parameter based on the radius of the loci, D is an variable or invariable determined by the system.

In another embodiment according to the present teachings, the delivery module may deliver advertisement to service requesters. For example, provided that loci are marked to be advertised, in case of a contingent happens, such as a traffic jam in a locus, a change in weather condition, or an end of an activity in a locus, the system may deliver advertisement or guidance information to requesters to conduct requesters in the specific locus to a different region that may be easier to get a vehicle service. According to the embodiment of the present teachings, the traffic jam condition may be determined by satellite views or vehicle density of the road monitor. Moreover, in the case of a road closing for maintenance, advertisement or guidance information may be delivered to requesters.

Figure 16:
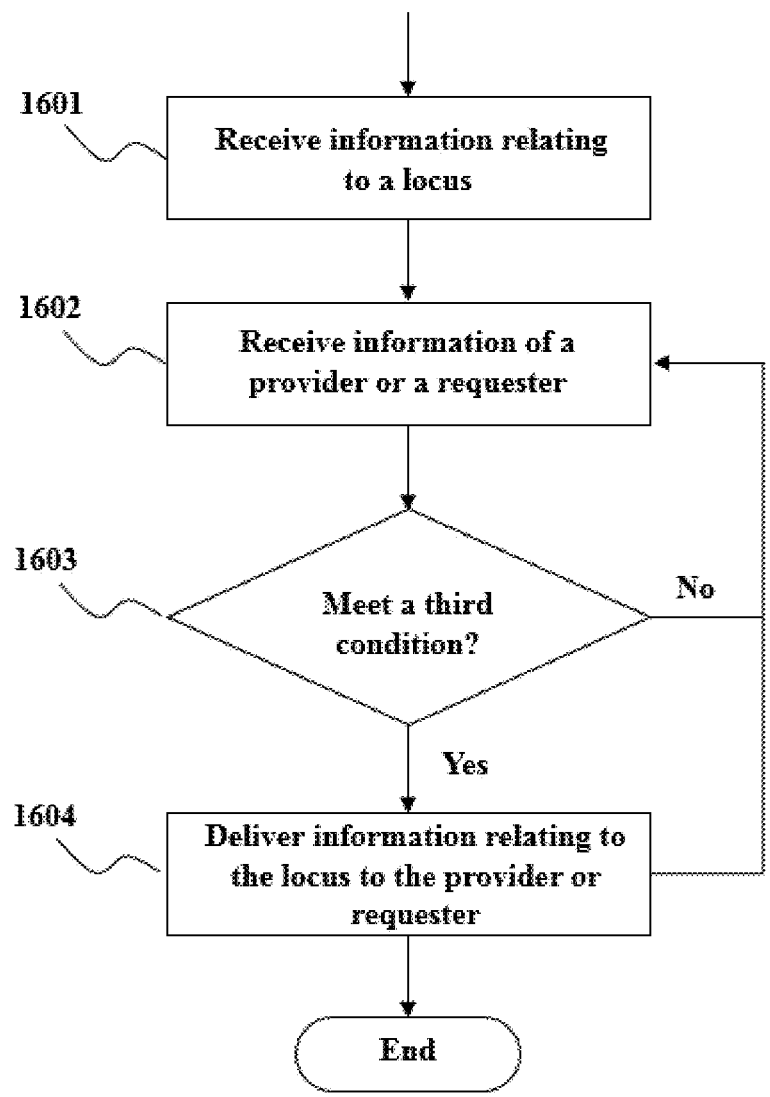
FIG. 16 is a flowchart of another exemplary process of delivering advertisement to service providers, according to an embodiment of the present teachings.

FIG. 16 is a flowchart of another exemplary process of delivering advertisement to service providers, according to an embodiment of the present teachings. At Block 1601, locus relating information is received. At Block 1602, information of service providers and requesters is received. As described above, the sequence of block 1601 and block 1602 is exchangeable. At block 1603, determination is made regarding whether a third condition is met. If the third condition is met, the operation illustrated in block 1604 is performed; otherwise, it returns to block 1602. At block 1604, information relating to a locus is delivered to one or more providers, or one or more requesters. In an embodiment, the third condition is related to combining orders. For example, if an order belongs to a locus, and is connectable with another order, then information of both orders may be delivered to the provider who accepts the first order. An exemplary method for combining the orders includes the following operations: of two orders Oi and Oj collected by the collection module, Oj is first order as it departs earlier, and Oi is second order as it departs later, and Oi belongs to a locus A. If the distance Dij between the departure point of second order Oi and the destination point of first order Oj is less than or equal to a distance threshold Dbase, then order Oi and order Oj are determined to be connectable on distance; and if the time interval Tij between the departure time of second order Oi and the arriving time of first order Oj is less than or equal to a time threshold TBase, then order Oi and order Oj are determined to be connectable in time. If order Oi and order Oj are determined to be connectable both on distance and in time; then Oi, Oj are determined to be possible combined orders. In an embodiment, Dbase is between 4 km to 6 km, TBase is between 5 minutes and 15 minutes. In another embodiment, the distance is calculated by distance calculator and the time interval is calculated by time calculator in the delivery module. In an embodiment, the distance and time interval are determined based on order information including, but not limited to, order number, longitude and latitude of departure point, longitude and latitude of destination point, and time of depart. It shall be noted that the described order information may be collected by collection module, or part of which is directly from requester's input.

Figure 17:
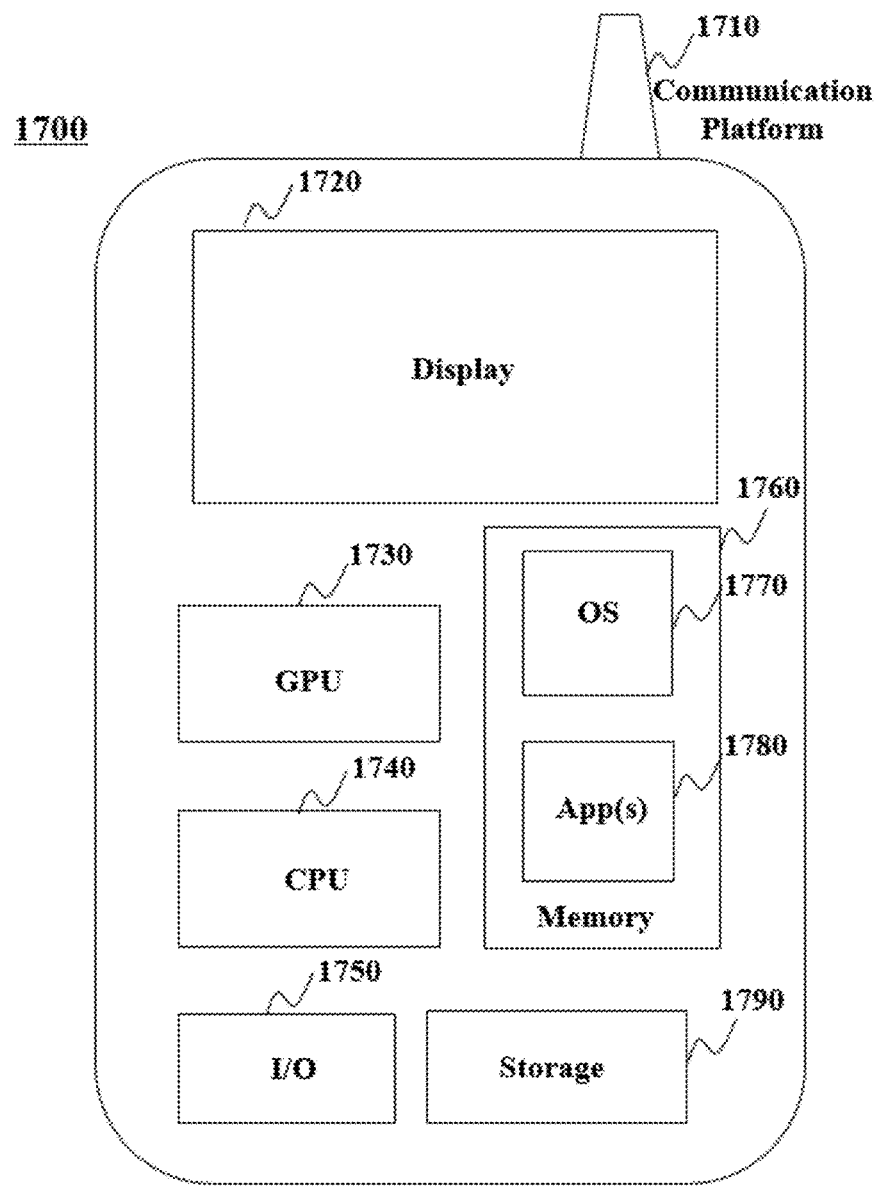
FIG. 17 depicts the architecture of a mobile device which may be used to implement a specialized system incorporating the present teaching.

FIG. 17 depicts the architecture of a mobile device which may be used to realize a specialized system implementing the present teachings. In this example, the user device on which information relating to an order for service or other information from the scheduling system is presented and interacted-with is a mobile device 1700, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1700 in this example includes one or more central processing units (CPUs) 1740, one or more graphic processing units (GPUs) 1730, a display 1720, a memory 1760, a communication platform 1710, such as a wireless communication module, storage 1790, and one or more input/output (I/O) devices 1750. Any other suitable component, including but not limited to a system bus or a controller (not shown), may also be included in the mobile device 1700. As shown in FIG. 17, a mobile operating system 1770, e.g., iOS, Android, Windows Phone, etc., and one or more applications 1780 may be loaded into the memory 1760 from the storage 1790 in order to be executed by the CPU 1740. The applications 1780 may include a browser or any other suitable mobile apps for receiving and rendering information relating to an order for service or other information from the scheduling system on the mobile device 1700. User interactions with the information stream may be achieved via the I/O devices 1750 and provided to the scheduling system 102 and/or other components of system 100, e.g., via the network 114.

To implement various modules, units, and their functionalities described in the present disclosure, computer hardware platforms may be used as the hardware platform(s) for one or more of the elements described herein (e.g., the scheduling system 102, and/or other components of the system 100 described with respect to FIGS. 1-16). The hardware elements, operating systems and programming languages of such computers are conventional in nature, and it is presumed that those skilled in the art are adequately familiar therewith to adapt those technologies to the management of the supply of service as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 18:
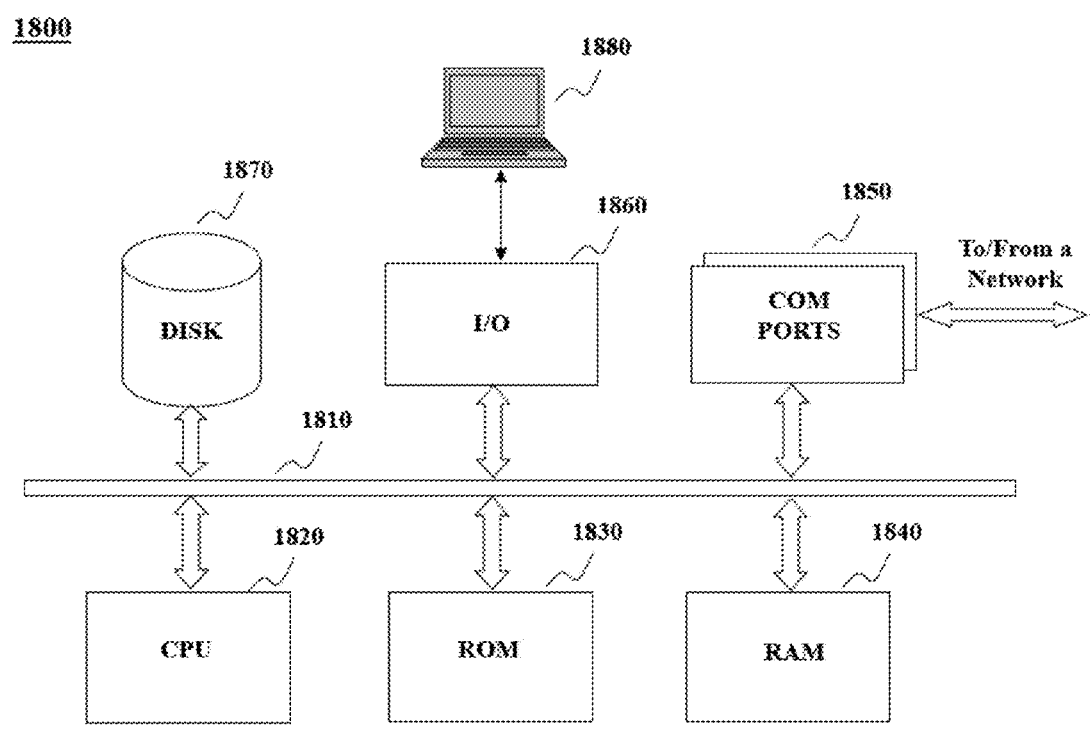
FIG. 18 depicts the architecture of a computer which may be used to implement a specialized system incorporating the present teaching.

FIG. 18 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1800 may be used to implement any component of the management of the supply of service as described herein. For example, the scheduling system 102, etc., may be implemented on a computer such as computer 1800, via its hardware, software program, firmware, or a combination thereof. Although only one such computer is shown, for convenience, the computer functions relating to the management of the supply of service as described herein may be implemented in a distributed fashion on a number of similar platforms, to distribute the processing load.

The computer 1800, for example, includes COM ports 1850 connected to and from a network connected thereto to facilitate data communications. The computer 1800 also includes a central processing unit (CPU) 1820, in the form of one or more processors, for executing program instructions. The exemplary computer platform includes an internal communication bus 1810, program storage and data storage of different forms, e.g., disk 1870, read only memory (ROM) 1830, or random access memory (RAM) 1840, for various data files to be processed and/or communicated by the computer, as well as possibly program instructions to be executed by the CPU. The computer 1800 also includes an I/O component 1860, supporting input/output flows between the computer and other components therein such as user interface elements 1880. The computer 1800 may also receive programming and data via network communications.

Hence, aspects of the methods of the management of supply of service and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with the management of supply of service. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the scheduling system for management of supply of service as disclosed herein may be implemented as a firmware, firmware/software combination, firmware/hardware combination, or a hardware/firmware/software combination.

EXAMPLES

The following examples are provided for illustration purposes, and are not intended to limit the scope of the present teachings.

Example 1

Using Beijing as an example, vehicle demands from a suburban area during the morning rush-hours are much more than those from an area around the city center. For example, there is a great demand for taxi services in the Huilongguan area from 8:00 am to 9:00 am; during the evening rush-hour, for example from 18:00 pm to 19:00 pm, there is a great demand for taxi services in the Zhongguancun area.

At the server (or a scheduling system) of taxi booking software or call center, a great number of booking orders collected from passengers are stored. In general, the format of the booking orders collected from passengers is as follows in Table 1:

TABLE 1

| Order ID | Passenger Phone Number | Starting point | Starting Time | Longitude & Latitude of Starting location |
|---|---|---|---|---|
| 140002 | 13300000001 | Zhongguancun Street No. 10 | 2014/2/20 18:00 | xxxxxx |
| 140012 | 13300000002 | Zhongguancun Street No. 20 | 2014/2/20 18:00 | xxxxxx |

Normally, once a passenger makes an order for a taxi, an order information in an entry in Table 1 may be sent to the server.

The server (or a scheduling system), according to the starting location of the orders, performs a statistical analysis (e.g., using the Dbscan clustering algorithm) on the orders in a certain area (e.g., Beijing) during a certain time period (from 18:00 pm to 18:05 pm in the same day), and identifies a plurality of loci(region1: around Zhongguancun area, 2.5 km radius, number of passengers: 200; region2: around Shangdi, 3.4 km radius, number of passengers: 300; . . . ).

Each taxi reports its latitude and longitude information every 10 seconds by an application the taxi driver uses. An exemplary format of the information is as follows in Table 2:

TABLE 2

| Driver ID | Reporting time | Current point | Longitude & Latitude |
|---|---|---|---|
| 12345 | 2014/2/20 18:00 | Around Renmin University of China | Xxxxxx |

After selecting appropriate locus, the server (or the scheduling system) may deliver information "Hello Mr., X km from you, a great number of passengers demand vehicle in XXX" to one or more taxi drivers (providers).

Example 2

A scheduling system identifies a plurality of loci utilizing Dbscan clustering algorithm based on the vehicle demands distribution of Shanghai. The scheduling system also calculates the number of orders, the location (by way of, e.g., the latitude and longitude) of the locus center, the locus radius, the number of providers, and the number of orders accepted, the order acceptance rate, the provider-requester ratio in a locus, based on, e.g., the order information and the provider information in the locus.

The order information may include: order numbers, starting locations (by way of, e.g., the latitude and longitude), starting times, whether an order has been accepted, or the like, or a combination thereof; the taxi information may include: driver numbers (IDs), report times, the location (by way of, e.g., longitude and latitude) of providers. The number of orders in the locus may be the total number of orders in the locus. The latitude and longitude of the locus center may be the average value of the latitude and longitude of all the orders in the locus. The radius of the locus may be the maximum distance between the locus center and of the location relating to an order in the locus. The number of providers in the locus may be the total number of the providers whose distance between the locus center and the location of their taxi is less than the radius of the locus. The number of orders accepted may be the total number of orders accepted in the locus. The order acceptance rate may be the ratio of the number of orders accepted and the number of all the orders in the locus. The provider-requester ratio may be the ratio of the number of providers to the number of the orders in the locus.

In an exemplary scenario, the number of providers, the number of orders, order acceptance rate, provider-requester ratio are listed as follows in Table 3:

TABLE 3

| Number of orders | Number of acceptance | Number of providers | Acceptance rate (number of acceptance/ number of orders) | Provider-requester ratio (number of providers/number of orders) |
|---|---|---|---|---|
| 13 | 7 | 175 | 0.538462 | 13.46154 |
| 23 | 12 | 228 | 0.521739 | 9.913043 |
| 20 | 14 | 199 | 0.7 | 9.95 |
| 16 | 7 | 120 | 0.4375 | 7.5 |
| 13 | 9 | 155 | 0.692308 | 11.92308 |
| 22 | 7 | 140 | 0.318182 | 6.363636 |
| 33 | 12 | 299 | 0.363636 | 9.060606 |
| 15 | 6 | 147 | 0.4 | 9.8 |
| 14 | 6 | 73 | 0.428571 | 5.214286 |
| 9 | 3 | 77 | 0.333333 | 8.555556 |
| 7 | 1 | 34 | 0.142857 | 4.857143 |
| 31 | 11 | 275 | 0.354839 | 8.870968 |
| 5 | 2 | 69 | 0.4 | 13.8 |
| 7 | 5 | 126 | 0.714286 | 18 |
| 10 | 2 | 45 | 0.2 | 4.5 |

TABLE 3-continued

| Number of orders | Number of acceptance | Number of providers | Acceptance rate (number of acceptance/ number of orders) | Provider-requester ratio (number of providers/number of orders) |
|---|---|---|---|---|
| 5 | 5 | 59 | 1 | 11.8 |
| 22 | 7 | 140 | 0.318182 | 6.363636 |
| 33 | 12 | 299 | 0.363636 | 9.060606 |
| 31 | 11 | 275 | 0.354839 | 8.870968 |
| 17 | 7 | 67 | 0.411765 | 3.941176 |
| 25 | 15 | 134 | 0.6 | 12.6 |
| 12 | 5 | 72 | 0.416667 | 6 |
| 8 | 4 | 31 | 0.5 | 3.875 |
| 8 | 5 | 109 | 0.625 | 13.625 |
| 4 | 1 | 88 | 0.25 | 22 |
| 6 | 3 | 48 | 0.5 | 8 |
| 4 | 2 | 34 | 0.5 | 8.5 |
| 17 | 7 | 67 | 0.416667 | 6 |
| 8 | 4 | 31 | 0.5 | 3.875 |

Figure 19:
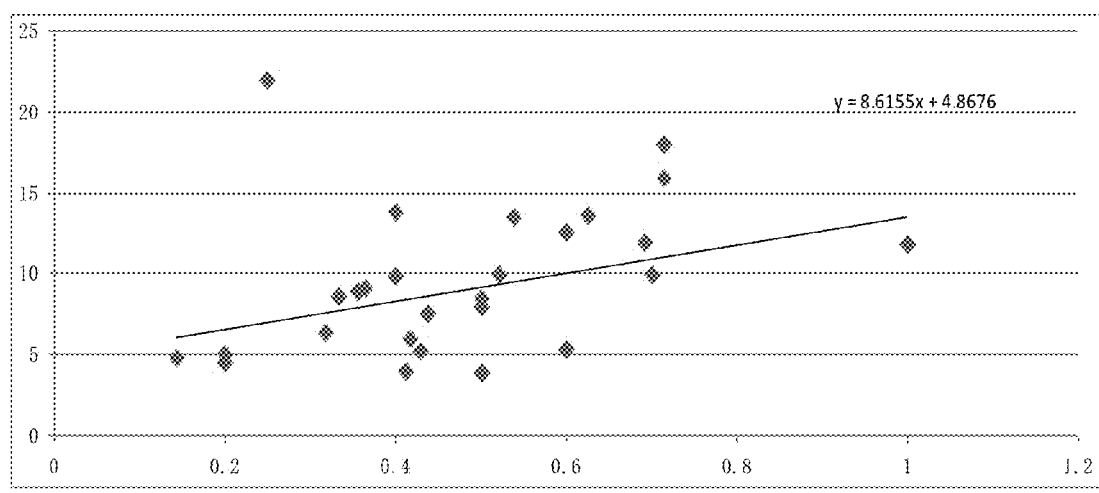
FIG. 19 is a diagram illustrating the correlation between provider-requester ratio and the order acceptance rate according to an embodiment of the present teachings.

From the data, it may be concluded that as the increasing of provider-requester ratio, the order acceptance rate significantly increases. Referring to FIG. 19, vertical axis represents the provider-requester ratio, horizontal axis represents the order acceptance rate. For the expected order acceptance rate set to be 1, the ideal provider-requester ratio may be 16, which means the order acceptance rate and the provider-requester ratio may roughly meet a certain linear relationship. As illustrated in FIG. 19, the linear relationship may be approximated by the relationship $y=8.6155x+4.8676$.

A mismatch of the supply-demand in the locus may be indicated by the order acceptance rate and the provider-requester ratio.

In some embodiments, if the order acceptance rate in one certain locus is above 80%, the locus may be considered healthy (i.e. the demand-supply relationship may be considered healthy in the locus); if the order acceptance rate in one certain locus is under 80%, the locus may be considered unhealthy (i.e. the demand-supply relationship may be considered unhealthy in the locus). As to a locus whose order acceptance rate is under 80%, if the provider-requester ratio (divide the number of providers by the number of orders) is under 10, the provider-requester ratio may be considered low. One reason for the low order acceptance rate may be that the number of providers are insufficient to satisfy orders for service in the locus. It may be beneficial to encourage providers from adjacent regions to enter and service the locus. This may be facilitated by delivering information relating to the locus to providers in the adjacent regions. As to a locus whose order acceptance rate is under 80%, if the provider-requester ratio is above 10, the reason for the low order acceptance rate may be something other than a low provider-requester ratio, and it may be unbeneficial to encourage providers from adjacent regions to enter and service the locus.

In summary, a locus with low order acceptance rate and low provider-requester ratio may have a mismatch between the supply and demand. It is presented in Table 4:

TABLE 4

| Number of orders | Number of acceptance | Number of providers | Acceptance rate (number of acceptance/ number of orders) | Provider-requester ratio (number of providers/number of orders) |
|---|---|---|---|---|
| 22 | 7 | 140 | 0.318182 | 6.363636 |
| 33 | 12 | 299 | 0.363636 | 9.060606 |
| 31 | 11 | 275 | 0.354839 | 8.870968 |

These 3 vehicle demand dense loci illustrated in Table 4 may be considered as critically unhealthy (imbalanced of supply and demands), and providers may be encouraged to enter and service the loci. This may be facilitated by delivering information relating to the loci to providers, e.g., those in the adjacent regions.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A system configured to generate a presentation of a locus of an online transportation service on a provider mobile device, comprising:
    at least one internet interface of a network system to connect to at least one network of the network system;
    at least one receiving portion of a positioning system to receive positioning signals from a plurality of detection portions of the positioning system via the at least one network, wherein
        the positioning signals include locations of the plurality of detection portions of the positioning system, and
        the plurality of detection portions of the positioning system include a plurality of provider mobile devices with a positioning capability and a plurality of requester mobile devices with the positioning capability;
    at least one receiving portion of a traffic condition reporting system to receive traffic condition of a region or orders of the online transportation service via the at least one network, wherein the traffic condition reporting system includes a broadcasting portion and the at least one receiving portion;
    at least one user log including information of a plurality of service users and a plurality of service providers of the transportation service;
    processing circuits to receive information from the at least one receiving portion of the positioning system and the at least one receiving portion of the traffic condition reporting system,
    wherein during operation, the processing circuits:
        connect to the plurality of requester mobile devices, via the at least one network, associated with the plurality of service users of the transportation service;
        connect to the plurality of provider mobile devices, via the at least one network, associated with the plurality of service providers of the transportation service;
        load a set of instructions for providing an online transportation service from a storage medium;
        receive first electronic signals including a plurality of orders for the online transportation service from the plurality of requester mobile devices and the locations of the plurality of requester mobile devices;
        for each order of the plurality of orders, operate logic circuits in the processing circuits to:
            make a logic judgement whether the order belongs to a first number of orders sharing a first characteristic relating to a first location;
            upon the logic judgement that the order belongs to the first number of orders, incorporate a location of the order in a locus related to the first number of orders;
        operate the logic circuits to identify at least one provider from the plurality of service providers;
        operate the logic circuits to obtain an order acceptance rate of orders in the locus;
        operate the logic circuits to obtain a ratio of a number of providers in the locus to a number of orders in the locus; and
        upon determining that the order acceptance rate in the locus is less than an acceptance threshold and the ratio in the locus is less than a ratio threshold, generate second electronic signals including information relating to the locus to send to the at least one provider.

2. The system of claim 1, wherein the processing circuits are configured to receive third electronic signals including information of at least one of an order location relating to an order of the plurality of orders, a provider location relating to a provider, a time relating to an order placed, a time for pickup relating to an order of the plurality of orders, an order acceptance rate relating to the plurality of orders, a traffic condition relating to the locus, a road condition relating to the locus, a weather condition relating to the locus, or historical information relating to the locus.

3. The system of claim 1, wherein the first characteristic includes that a location of every order of the first number of orders is within a first threshold distance from the first location.

4. The system of claim 3, wherein the processor circuits are further configured to adjust the first threshold distance according to the traffic condition of the locus.

5. The system of claim 3, wherein the processor circuits are further configured to adjust the first threshold distance according to a condition specified by the at least one provider or a requester associated with the at least one provider.

6. The system of claim 1, wherein the processing circuits are further configured to operate the logic circuits to identify the locus based on at least one cluster algorithm.

7. The system of claim 6, wherein the at least one cluster algorithm includes at least one of CLARANS, PAM, CLATIN, CLARA, DBSCAN, BIRCH, OPTICS, WaveCluster, CURE, CLIQUE, K-means algorithm, or hierarchical algorithm.

8. The system of claim 1, wherein the processing circuits are further configured to operate the logic circuits to identify a second number of providers relating to the locus, the second number of providers sharing a second characteristic.

9. The system of claim 8, wherein the second characteristic includes that a distance between the first location and a location relating to a provider of the second number of providers is less than a second threshold.

10. The system of claim 8, wherein the processing circuits are further configured to operate the logic circuits to mark the locus based on a determination that the ratio of a first number of the first number of orders to a second number of the second number of providers exceeds a third threshold.

11. The system of claim 1, wherein the processing circuits are further configured to operate the logic circuits to identify an area, and wherein the locus is determined based on one or more orders of the plurality of orders, the one or more orders relating to the area.

12. The system of claim 1, wherein the processing circuits are further configured to operate the logic circuits to determine the locus based on a determination that a first number of the first number of orders exceeds a fourth threshold.

13. The system of claim 1, wherein the processing circuits are further configured to operate the logic circuits to determine a distance between the first location and a location relating to the at least one provider, and wherein the distance is less than a fifth threshold.

14. The system of claim 1, wherein the processing circuits are further configured to operate the logic circuits to determine a time for the at least one provider to travel to the first location, and wherein the time is less than a sixth threshold.

15. The system of claim 1, wherein a distance between the at least one provider and the locus is between a predetermined first distance and a predetermined second distance; and the processing circuits are further configured to send fifth electronic signals including an advertisement to the at least one provider.

16. The system of claim 15, wherein the predetermined first distance is a radius r' of the locus, and the predetermined second distance is r'+d, d being a predetermined distance.

17. The system of claim 1, further comprising:

at least one base station in wireless communication with the processing circuits;

a plurality of requester mobile devices in wireless communication with the at least one base station, each associated with a service requester of the plurality of orders; and at least one provider mobile device in wireless communication with the at least one base station, each associated with a provider of the at least one provider, wherein each of the plurality of requester mobile devices and the plurality of provider mobile devices includes:

a global positioning system receiver, and a wireless communication module configured to connect the global positioning system receiver with a global positioning system.

18. The system of claim 17, wherein the at least one provider mobile device includes a built-in device of a motor vehicle.

19. The system of claim 1, wherein the processing circuits are further configured to send the information relating to the locus to a requester relating to an order of the locus.

20. A system configured to generate a presentation of a locus of an online transportation service on a provider mobile device, comprising:

at least one server operating an online transportation service platform:

at least one user log in communication with the at least one server, including information of a plurality of service users and a plurality of service providers of a transportation service;

at least one network via a plurality of internet exchange points;

a plurality of authorized requester mobile devices associated with the plurality of service users of the transportation service, in communication with the at least one server via the at least one network, wherein the plurality of requester mobile devices include a positioning system to obtain locations of the plurality of requester mobile devices and transmits the locations to the at least one server;

a plurality of authorized provider mobile devices associated with the plurality of service providers, in communication with the at least one server via the at least one network, wherein the plurality of provider mobile devices include a positioning system to obtain locations of the plurality of provider mobile devices and transmits the locations to the at least one server;

a broadcast station to receive traffic condition relating to an order locus of an order of the online transportation service from a third party traffic reporting system via at least one of an interface, a portal or an application;

wherein the at least one server, during operation, further:

loads a set of instructions for providing an online transportation service from a storage medium;

receives first electronic signals including a plurality of orders for the online transportation service from the plurality of requester mobile devices and the locations of the plurality of requester mobile devices;

for each order of the plurality of orders:

makes a logic judgement whether the order belongs to a first number of orders sharing a first characteristic relating to a first location;

upon the logic judgement that the order belongs to the first number of orders, incorporates a location of the order in a locus related to the first number of orders;

identifies at least one provider from the plurality of service providers;

operates the logic circuits to obtain an order acceptance rate of orders in the locus;

operates the logic circuits to obtain a ratio of a number of providers in the locus to a number of orders in the locus; and upon determining that the order acceptance rate in the locus is less than an acceptance threshold and the ratio in the locus is less than a ratio threshold, generates second electronic signals including information relating to the locus to send to the at least one provider.

\* \* \* \* \*